(12) United States Patent
Perelstain et al.

(10) Patent No.: US 8,223,788 B1
(45) Date of Patent: Jul. 17, 2012

(54) METHOD AND SYSTEM FOR QUEUING DESCRIPTORS

(75) Inventors: Amir Perelstain, Kfar Saba (IL); Yoram Gross, Nes-Ziona (IL)

(73) Assignee: Ethernity Networks Ltd, Lod, IL (US)

( * ) Notice: Subject to any disclaimer, the term of this patent is extended or adjusted under 35 U.S.C. 154(b) by 522 days.

(21) Appl. No.: 11/877,876

(22) Filed: Oct. 24, 2007

(51) Int. Cl.
*H04L 12/54* (2006.01)
(52) U.S. Cl. ........................................ 370/429; 370/412
(58) Field of Classification Search ............... 710/35; 370/429, 412, 417, 390, 415
See application file for complete search history.

(56) References Cited

U.S. PATENT DOCUMENTS

| | | | | |
|---|---|---|---|---|
| 6,032,190 A | * | 2/2000 | Bremer et al. | 709/238 |
| 6,857,030 B2 | * | 2/2005 | Webber | 710/33 |
| 7,215,662 B1 | * | 5/2007 | Lim et al. | 370/352 |
| 7,397,809 B2 | * | 7/2008 | Wang | 370/417 |
| 7,822,051 B1 | * | 10/2010 | Perelstain et al. | 370/412 |
| 2004/0008716 A1 | * | 1/2004 | Stiliadis | 370/429 |
| 2007/0223533 A1 | * | 9/2007 | Kirrmann et al. | 370/469 |

* cited by examiner

*Primary Examiner* — Chuong T Ho
(74) *Attorney, Agent, or Firm* — Reches Patents

(57) ABSTRACT

A system including: (a) a processor, adapted to generate first type descriptors, second type descriptors and second type descriptor pointers; wherein the first type descriptors and the second type descriptors describe data entities received by the system, and wherein a size of a second type descriptor pointer equals a size of a first type descriptor; and (b) a memory unit, connected to the processor, adapted to maintain a queue that stores at least one first type descriptor and at least one second type descriptor pointer.

23 Claims, 11 Drawing Sheets

METHOD AND SYSTEM FOR QUEUING DESCRIPTORS

RELATED APPLICATIONS

This present application is related to U.S. patent application Ser. No. 11/877,855, filed on Oct. 24, 2007 and is incorporated herein, in its entirety, by reference.

FIELD OF THE INVENTION

The invention relates to methods and systems for transmitting packets.

BACKGROUND OF THE INVENTION

Data networks that includes multiple clients (such as computers, peripherals, servers, wireless devices, etc.) typically include one or more devices that are responsible to manage communication between multiple clients (otherwise each pair of clients would demand a dedicated connection between the two clients). In packet-based networks, the managing of the communication between the clients is generally carried out by communication switches (widely referred to plainly as switches).

FIG. 1 is a block diagram of prior art switch 100. Switch 100 is adapted to convey information from multiple input ports 112, such as input ports 112(1) through 112(6), to multiple output ports 114, such as output ports 114(1) through 114(6). It is noted that according to some embodiments of prior art switches, at least some ports (not shown) of switch 100 are input/output ports, that are adapted both for reception of data and for transmission of data. For simplicity of explanation output ports are illustrated as being separated from input ports.

Switch 100 is adapted to receive data through input ports 112 in the form of data packets (commonly referred to as packets), wherein each packet includes both a payload, which is the actual data that should be conveyed to one or more destinations, and metadata. Metadata that is joined to the packet ahead of the payload is commonly referred to as header, and typically contains data such as packet length, header length, protocol needed to read the packet, error correction codes, data pertaining to the source of the packet, and data pertaining to the destination of the packet. Metadata that is joined to the packet following the payload is commonly referred to as trailer, and typically includes an end of packet sign. It is noted that different switches are adapted to different communication protocols, and that different communication protocols implement different forms of packets, and therefore different forms of headers and trailers. Notably, most of the switches are adapted to convey packets of different sizes, wherein sizes of packets usually differ from few dozens bits to few dozens kilobytes.

Whenever a packet is received by switch 100, it is processed by processor 120, and, conveniently, by packet processor 122 which is included in processor 120. It is noted that conveniently, packet processor 122 is adapted to process packets in a serial manner. Since packets may arrive at least partially parallel to each other via different ports, switch 100 conveniently includes incoming packets buffer (not shown), that is adapted to store incoming packets until they are processed by packet processor 122.

Packet processor 122 is adapted to separate each incoming packet into the payload, which is saved as a data entity 920 in memory unit 130, and to the metadata, which is further processed by packet processor 122. Packet processor 122 updates the metadata of the packet, so as to include a descriptor that refers to the location of the payload of the packet that is store in memory unit 130. Conveniently, metadata for each packet, and especially a descriptor to the location of the data entity 920 that stores the payload of the packet in memory unit 130, is stored in metadata storage 140, until it could be further processed. According to some embodiments of prior art switches, metadata storage 140 is included in memory unit 130.

Conveniently, memory unit 130 is divided into multiple memory pages 132 which are of identical size. FIG. 1 illustrates two data entities 920 which are stored in memory unit 130 and which stores the payloads of two packets: the size of data entity 920(1) is smaller than the size of the memory pages 132; and therefore, the respective descriptor need to store only the address of a single memory page 132. The size of data entity 920(2) is larger than the size of the memory pages 132, and requires four memory pages 132 to be stored; therefore, the respective descriptor need to store the addresses of four memory pages 132.

It is noted that while data entities 920(2) is illustrated as continuous to data entity 920(1) and as being stored in consecutive memory pages 132, neither in prior art solutions not according to the teaching of the invention must it necessarily be so.

Conveniently, packet processor 122 is adapted to perform a syntax analysis (commonly referred to as parsing) to every incoming packet, to retrieve protocol data of the packet, and to classify the packet according to one or more classifying rules, that pertain to the metadata, and, according to some prior art switches, also to an analysis of the payload.

Following the described actions, packet processor 122 assign each packet to a queue 150 which is assigned to one of the output ports 114, in response to the metadata of each packet, and, according to some prior art switches, according to an analysis of the payload. As illustrated in FIG. 1, multiple queues 150 could be assigned to a single output port 114. For example, the queues denoted as 150(11) through 150(13) are all assigned to port 114(1), the queues denoted as 150(31) and 150(32) are both assigned to port 114(3), and so forth. Conveniently, multiple queues 150 are assigned to a single output port 114 in embodiments of switches in which are different priority levels are assigned to the different packets, wherein each of the queues include packets that have a certain priority level, or which are included in a range of priority levels. Some switches assign multiple queues 150 to a single output port 114 to achieve benefits of assigning of a queue 150 to one or more specific packets providing services (some examples of such benefits are improving the switch communication rate, and improving the performance of one or more services).

According to some embodiments of prior art switches 100, packet manager 124, which is included in processor 120, is adapted to decide whether to admit or to deny each packet to the queue 150 to which it is assigned. Conveniently, packet manager 124 denies packets from being enqueued into a queue 150 when the transmission rate in the respective output port 114 exceeds a predetermined transmission rate threshold that is assigned to said output port 114. Conveniently, drop manager 124 is adapted to delete from memory unit 130 the data entity 920 which stores the payload of the denied packet, and to discard the metadata pertaining to said denied packet.

Packet manager 124 is adapted to create a descriptor 940 to each admitted packet, wherein the descriptor 940 refers to a location of the data entity 920 that includes the payload of the packet. Conveniently, packet manager creates the descriptor 940 in response to the metadata of the respective packet. Conveniently, the descriptors 940 include additional information, such as size of the payload, and so forth; wherein according to different embodiments of prior art switch 100, packet manager 124 add different information to the descriptors 940. Packet manager 124 than enqueues each packet to the queue 150 to which it was assigned.

It is noted that descriptors 940 are represented in FIG. 1 as filled boxes in each queue 150.

Conveniently, each of the queues 150 of prior art switch 100 are ordinary first-in-first-out (FIFO) queues, wherein each packet whose descriptor 940 is included in a queue 150 is transmitted to its destination only after all packets whose descriptors 940 where enqueued to said queue 150 were served.

Packet builder 126, which is conveniently included in processor 120, is responsible to access each of the queues 150 of switch 100 according to an access algorithm (such as, but not limited to, a round robin algorithm. In situations in which different priorities are assigned to different queues 150, the access algorithm is conveniently responsive to the priorities of the different queues. Moreover, different output port priorities could be assigned to the different output ports 114, wherein the access algorithm is further responsive to the output ports priorities). For every queue 150 accessed, packet builder 126 checks if the accessed queue 150 is empty, wherein in such case packet builder 126 proceeds to access queues 150 according to the access algorithm, or else, if the accessed queue 150 stores at least one descriptor 940, packet builder 126 reads the first descriptor 940 in the accessed queue 150, creates a metadata, in response to information included in the descriptor 940 and in the data entity 920 to which the descriptor 940 refers, creates a new packet from said data entity 920 and the created metadata, and provide the new packet to the output port 114 specified in the descriptor 940, to be transmitted to the destination of the packet.

The computing power demanded by a switch is provided by a processor, which is commonly implemented on a field programmable gate array (FPGA) chip. FPGA chips are reconfigurable, what facilitates the planning of the processor, and the processor itself more flexible in many ways. Communication needs of networks, however, are growing rapidly over the years, as typical networks serves ever growing number of clients, and as the communication rate of each client is increasing on the double. On top of superior computing abilities, contemporary switches are demanding increasing amounts of memory storage. Since the memory available on the field programmable gate array chip is limited and costly, it is customary practice to use an external memory units, and especially double-data-rate synchronous dynamic random access (DDR SDRAM) memory units, to support the memory requirements of chips.

External memory units, and especially DDR SDRAM memory units, however, suffer from considerable latency times, i.e. there is a considerable delay from the moment data is sent to the DDR SDRAM until the data is actually written and acknowledged, and the is a considerable delay from the moment a request for data is sent to the DDR SDRAM until the data is provided by the DDR SDRAM.

Therefore, there is a growing need for switches that can facilitate the memory capacity potential of external memory units, and especially of DDR SDRAM, while countering the potential shortcoming of latency times.

Conventionally, many prior switches encounter difficulties in multicasting packets, wherein multicasting packets loads the switch, and may postpone a transmission of higher priority transmissions.

There is a growing need for reliable and simple means of transmitting packets by switches, and especially means of multicasting packets efficiently.

SUMMARY OF THE INVENTION

A switch including: (i) a processor, adapted to dequeue a multicasting descriptor from a multicasting link-list in response to: (a) a requested number of duplications; (b) a duplications counter; and (c) a rejected duplications counter; and (ii) a memory unit, connected to the processor, adapted to maintain the multicasting link-list.

A method for transmitting packets, the method includes: (i) maintaining a multicasting link-list; and (ii) dequeuing a multicasting descriptor from the multicasting link-list in response to: (a) a requested number of duplications; (b) a duplications counter; and (c) a rejected duplications counter.

A computer readable medium having computer-readable code embodied therein for transmitting packets, the computer-readable code including instructions for: (i) maintaining a multicasting link-list; and (ii) dequeuing a multicasting descriptor from the multicasting link-list in response to: (a) a requested number of duplications; (b) a duplications counter; and (c) a rejected duplications counter.

BRIEF DESCRIPTION OF THE DRAWINGS

The foregoing and other objects, features, and advantages of the present invention will become more apparent from the following detailed description when taken in conjunction with the accompanying drawings. In the drawings, similar reference characters denote similar elements throughout the different views, in which.

DETAILED DESCRIPTION OF THE DRAWINGS

Figure 1:
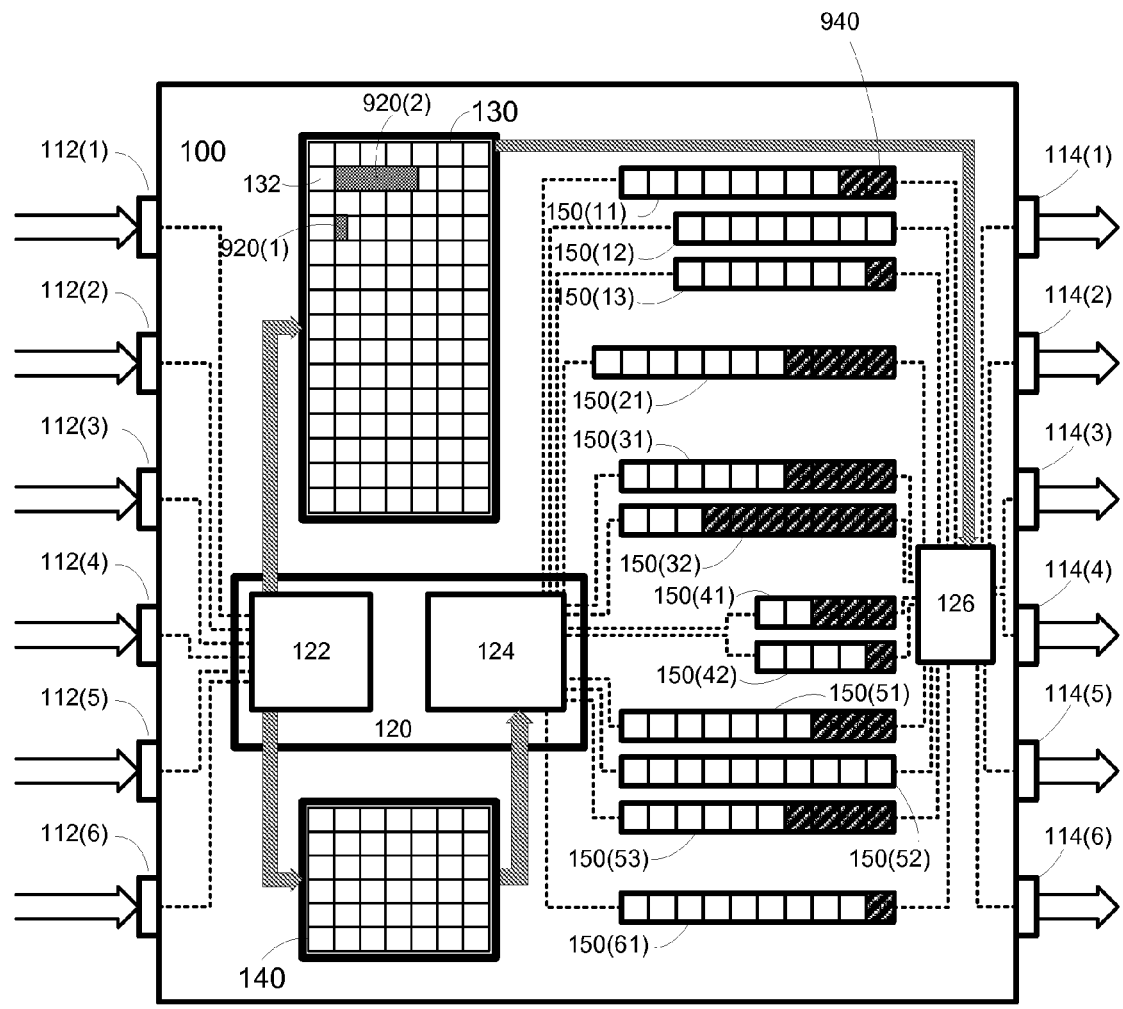
FIG. 1 is a block diagram of a prior art switch.
Figure 2:
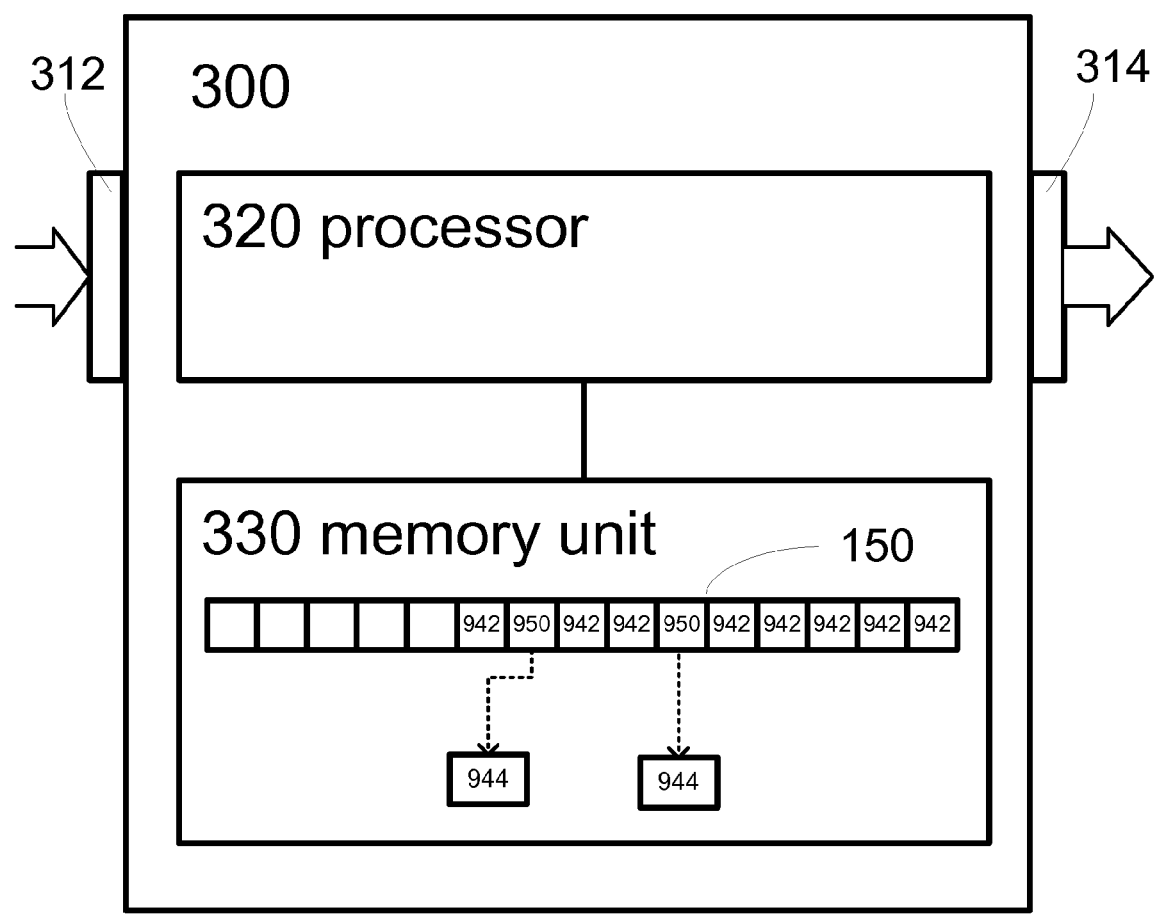
FIG. 2 illustrates a system, according to an embodiment of the invention.

FIG. 2 illustrates system 300 According to an embodiment of the invention. system 300 includes processor 320, that is adapted to generate first type descriptors 942, second type descriptors 944 and second type descriptor pointers 950; wherein the first type descriptors 942 and the second type descriptors 944 describe data entities (not shown in FIG. 2)

received by system 300, and wherein a size of a second type descriptor pointer 950 equals a size of a first type descriptor 942. It is noted that different embodiments of system 300 are adapted to carry out one or more stages of method 600. It is further noted that different embodiments of the invention are further adapted to carry out one or more stages of method 600, and one or more stages of method 700. It is noted that according to different embodiments of the invention, system 300 is adapted to run at least a portion of the computer code that is described below.

Processor 320 is connected to memory unit 330 that is adapted to maintain queue 150 that stores at least one first type descriptor 942 and at least one second type descriptor pointer 950. Each of the second type descriptor pointers 950 points to a second type descriptor 944, which are conveniently also stored in memory unit 330. It should be noted that even though memory unit 330 is adapted to maintain queue 150 which stores one or more of each of first type descriptors 942 and second type descriptor pointers 950, queue 150 may at any point also store only first type descriptors 942, second type descriptor pointers 950, or none of the above in situations in which queue 150 is empty.

According to an embodiment of the invention, memory unit 330 is a double-data-rate (DDR) synchronous dynamic random access memory (SDRAM) unit. According to an embodiment of the invention, the size of the first type descriptors 942 is responsive to a burst size of memory unit 330.

According to an embodiment of the invention, processor 320 is adapted to process first type descriptors 942 in order to retrieve data entities associated with the first type descriptors 942 and to process second type descriptors 944 in order to retrieve data entities associated with the second type descriptors 944. According to an embodiment of the invention, the data entities are also stored in memory unit 330.

According to an embodiment of the invention, system 300 includes one or more input ports 312, and one or more output ports 314. It is noted that according to an embodiment of the invention, at least some ports (not shown) of system 300 are input/output ports, that are adapted both for reception of data and for transmission of data. Conveniently, processor 320 is adapted to receive packets of data via input port 312, to create a data entity 920 that stores the payload of each packet, and to generate either a first type descriptor 942 or a second type descriptor, that refers to the respective data entity 920.

According to an embodiment of the invention, processor 320 is adapted to decide which type of descriptor to create for each data entity 920, in response to the size of the data entity 920. According to an embodiment of the invention, processor 320 is adapted to generate a second type descriptor 944 for every data entity 920 that exceeds a second size threshold. Conveniently, the second size threshold is responsive to a size of one or more memory buffers of the memory unit that stores data entity 920 (which may and may not be memory unit 330, according do different embodiments of the invention). It is noted that according to an embodiment of the invention, the second size threshold is responsive to long data entities 920. According to an embodiment of the invention, the second size threshold (and, according to an embodiment of the invention, the size of the one or more memory buffers of the memory unit that stores data entity 920) is determined so as to facilitate an efficient handling of long data entities 920.

It is noted that according to some embodiments of the invention, first type descriptors 942 are smaller than second type descriptors 944, and thus, according to some embodiments of the invention, can refer only to data entities 920 of a limited size. According to an embodiment of the invention, first type descriptors 942 can only refer to data entities 920 that are smaller than the second size threshold.

According to an embodiment of the invention, processor 320 is adapted to generate a second type descriptor 944 for every data entity 920 that exceeds a first size threshold, that is smaller than the second size threshold, and, according to an embodiment of the invention, is also smaller than the size of one or more memory buffers of the memory units that stores data entity 920. According to an embodiment of the invention, the first size threshold is responsive to the length of short data entities 920.

It is noted that, conveniently, it is easier for processor 320 to manage first type descriptors 942 than second type descriptors 944 (for reasons such as, though not limited to, size differences between the two types of descriptors, and the additional actions required to read the second type descriptor pointer 950 and than the second type descriptor 944). Nevertheless, according to some embodiments of the invention, in some situations it is advantageous to generate a second type descriptor 944 for a data entity 920 and not a first type descriptor 942; even in situations in which a first type descriptor 942 is sufficient to refer to data entity 920.

According to an embodiment of the invention, processor 320 is further adapted to generate a second type descriptor 944 for a data entity 920 that exceeds a first size threshold and to allocate a single memory buffer to store a data entity portion (not shown) that is smaller than a second size threshold; wherein the first size threshold is smaller than the first size threshold. Conveniently, at least some of the packets received by system 300 are not received as one continuous uninterrupted bulk of data, but rather divided into shorter communication packets (not shown), that arrives over a span of time, not necessarily successive to one another, wherein system 300 is adapted to reconstruct each packet that was divided, from the shorter communication packets. Conveniently, all of the shorter communication packets are of the same size, except from some of the shorter communication packets that carry ends of packets, which may be shorter. Furthermore, according to an embodiment of the invention, the second size threshold equals the size of the shorter communication packets.

Conveniently, every shorter communication packet that is received by system 300 is either a part of a packet the receiving of which was already initialized, or a first shorter communication packet of a previously unreceived packet. According to an embodiment of the invention, processor 320 is adapted to decide which type of a descriptor to create for each packet in response to the first shorter communication packet of the packet. According to an embodiment of the invention, processor 320 is adapted to generate a first type descriptor 942 for a packet only if the first shorter communication packet includes an end-of-packet signal of the packet, and a second type descriptor 942 otherwise. It is noted that, conveniently, processor 320 is adapted to enqueue either a first type descriptor 942 or a second type descriptor pointer 950 which refer to a received packet into queue 150 only after the end-of-packet signal of said received packet was received by system 300.

As an example only, and not intended to limit the scope of the invention in any way, according to an embodiment of the invention, the first size threshold equals a size of the shorter communication packets according to the embodiment of the invention, which is 64 Bytes, and the second size threshold equals a size of the memory buffer according to the embodiment of the invention, which is 2 kilobytes. According to said embodiment, whenever a first shorter communication packet does not include an end-of-packet signal, processor 320 is adapted to generate a second type descriptor 944 for the received packet, since the received packet is larger than 64 Bytes. System 300 than writes the payloads of the shorter communication packets that belongs to the received packet to the same memory buffer to which second type descriptor 944 refers.

If the received packet is smaller than 2 kilobytes, which is the size of a single memory buffer, according to said embodiment of the invention, all the payloads are written to the same memory buffer. If the received buffer is larger than 2 kilobytes, than system 300 is adapted to assign additional memory buffers to the received packets, wherein said second type descriptor 944 is updated so as to refer to all the memory buffers that stores data of the received packet.

Figure 3:
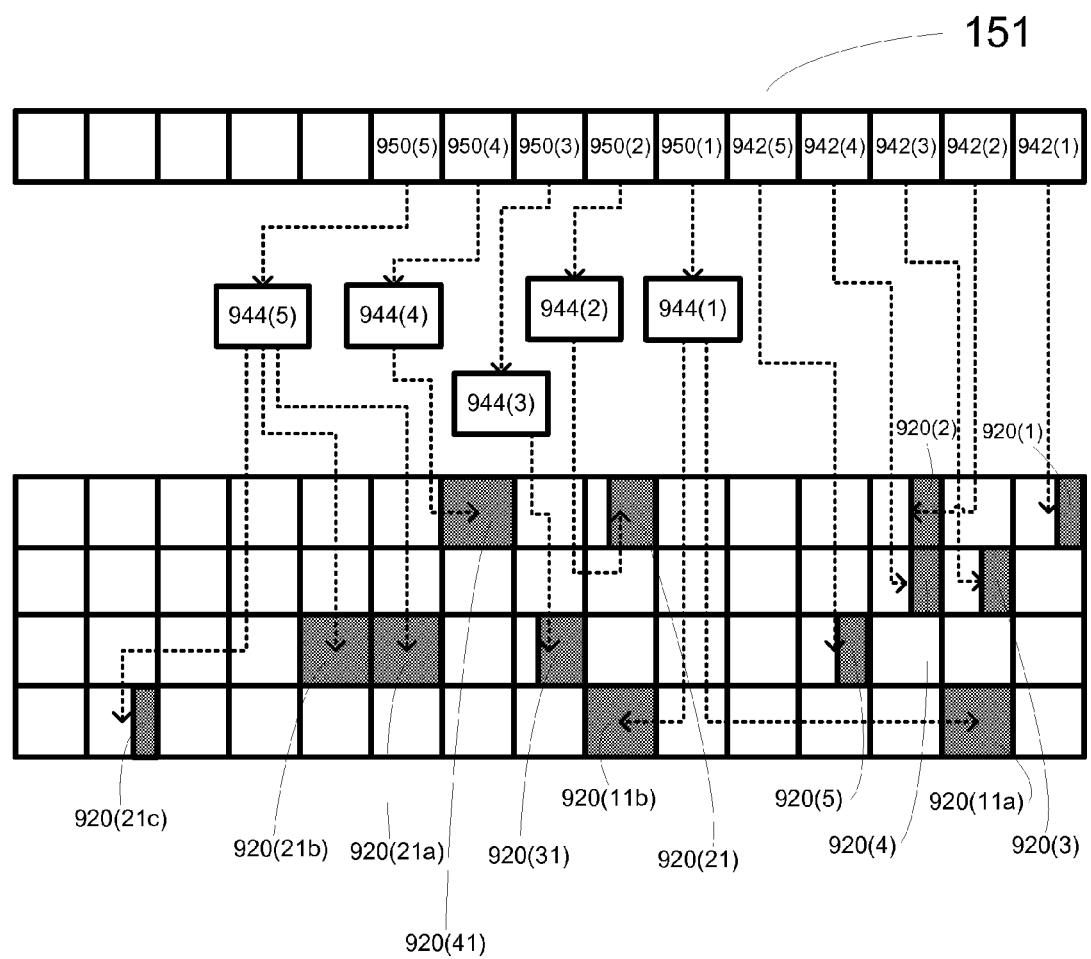
FIG. 3 illustrates a queue according to an embodiment of the invention.

Referring now to FIG. 3 that illustrates queue 151 according to an embodiment of the invention. Queue 151 stores five first type descriptors 942 (denoted as 942(1) through 942(5)) and five second type descriptor pointers 950 (denoted as 950(1) and 950(5)) that points to five second type descriptors 944 (denoted as 944(1) and 944(5)).

Each one of the first type descriptors 942 stored in queue 151 refers to a single memory buffer, wherein each of the memory buffers referred by first type descriptors 942(1) through 942(5) is only partly full, since the respective data entities 920(1) through 920(5) are smaller than a second size threshold.

Second type descriptors 944(2) through 944(4), which are pointed to by second type descriptor pointers 950(2) through 950(4) that are stored in queue 151, refer to data entities 920 which are all larger than the first size threshold, wherein data entities 920(21) and 920(31) are smaller than or of equal size to the second size threshold, and the size of data entity 920 (41) equals the second size threshold.

Second type descriptor 944(1), which is pointed to by second type descriptor pointer 950(1) that is stored in queue 151, refer to data entity that is stored in two different memory buffers (the parts of the data entity are denoted as 920(11a) and 920(11b)). Second type descriptor 944(5), which is pointed to by second type descriptor pointer 950(5) that is stored in queue 151, refer to data entity that is stored in three different memory buffers (the parts of the data entity are denoted as 920 (51a) through 920(51c)).

Referring now back to FIG. 2. According to an embodiment of the invention, processor 320 is further adapted to generate at least one second type descriptor 944 that includes data pertaining to multiple destinations (it is noted that conventionally, the sending of the same data, and especially of the same packet, to multiple destinations, is known as multicasting). It is noted that, according to some embodiments of the invention, some of the packets that are received by system 300 are addressed to multiple destination (such as to multiple clients of system 300). It is noted that according to some embodiments of the invention, system 300 is adapted to duplicate a packet to multiple destination (such as, though not limited to, for the purpose of packet sniffing, or when serving multiple users like IPTV (IP television)).

Conveniently, according to embodiments of the invention in which processor 320 is adapted to generate at least one second type descriptor 944 that includes data pertaining to multiple destinations, second type descriptors 944 include one or more fields dedicated to store data pertaining to the multiple destinations. According to an embodiment of the invention, processor 320 is further adapted to generate at least one second type descriptor 944 that includes a multicasting bit array, wherein different bits of the multicasting bit array are associated with different destinations.

Conveniently, every bit of the multicasting bit array is associated to a specific queue 150 of system 300, and denotes whether the packet that is to be multicasted should be sent to the specific queue 150 or not. For example, according to an embodiment of the invention, a logical value "1" of every bit signals that said packet should be multicasted to the queue 150 that is associated with said bit, and a logical value "0" denotes that the packet should not be sent to queue 150. It is noted that, according to an embodiment of the invention, additional bits of the second type descriptor 944 are used for multicasting. For example, and not intending to limit the scope of the invention in any way, the multicasting bit array includes 128 bit, that enables each data entity to be sent to any subgroup of a group of 128 queues 150 of system 300, wherein additional bits that are stored elsewhere in the second type descriptor 944 denotes one group out of multiple groups of queues 150. Continuing the same example, system 300 includes 512 queues 150, which are divided into four groups of 128 queues each, wherein each packet could be sent to any subgroup of one of the subgroups of queues 150, using a single second type descriptor 944.

According to an embodiment of the invention, processor 320 is adapted to generate at least one second type descriptor 944 that refers to (rather than includes) data which is pertaining to multiple destinations, which is stored elsewhere.

Figure 4A:
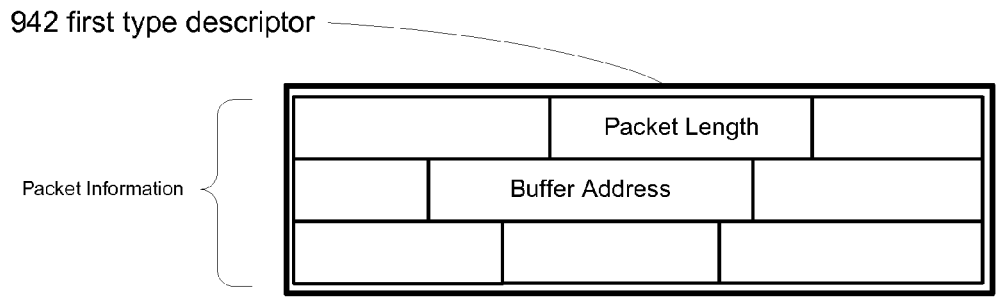
FIG. 4a illustrates a first type descriptor, according to an embodiment of the invention.
Figure 4B:
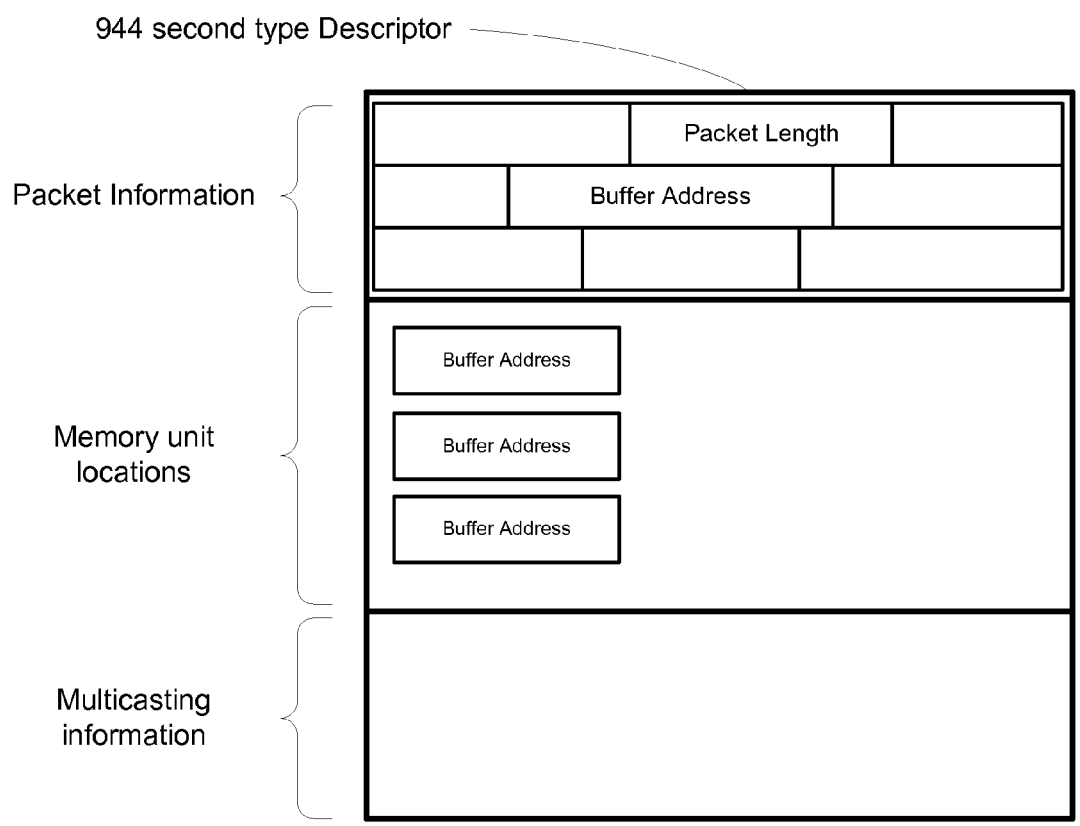
FIG. 4b illustrates a second type descriptor, according to an embodiment of the invention.

Referring now to FIGS. 4a and 4b. FIG. 4a illustrates a first type descriptor 942, according to an embodiment of the invention, and FIG. 4b illustrates a second type descriptor 944, according to the same embodiment of the invention. Conveniently, first type descriptor 942 includes different fields, such as a location field that refers to a location of a data entity 920 in a memory unit, such as though not necessarily, memory unit 330, a packet length field that stores data pertaining to the size of the respective packet, and so forth. It is noted that, according to different embodiments of the invention, processor 320 is adapted to write data into different fields of a first type descriptor 942 during different stages of the handling of the respective packet.

According to an embodiment of the invention, second type descriptor 944 includes three different portions. A first portion, denoted in FIG. 4b as packet information, is conveniently constructed similarly to first type descriptors, to facilitate the handling of the different types of descriptors by system 300, and especially by processor 320.

A second portion, denoted in FIG. 4b as memory unit locations, includes additional references to memory buffers of the memory unit in which the respective data entity 920 is stored, in case the size of the data entity exceeds the second size threshold.

A third portion of second type descriptor 944, denoted in FIG. 4b as multicasting information, includes data pertaining to multiple destinations of the packet. It is noted that according to an embodiment of the invention, the third portion includes multicasting bit array, and that, according to an embodiment of the invention, additional bits pertaining to multiple locations of the packet are included in either the first portion or the second portion.

According to another embodiment of the invention, the third portion includes a reference to data pertaining to multiple destinations of the packet that is stored elsewhere. It is noted that, according to an embodiment of the invention, a size of the first portion equals the size of the first type descriptors, and at least one field of the first portion is identical to at least one field of the first type descriptors. The similarity of the first portion to first type descriptor 942 according to some embodiments of the invention facilitates an easier and faster handling of the different types of descriptors by processor 320.

It is noted that not all second type descriptors 944 include both the second and the third portions which are described above. If only one of the second and the third portions are necessary, the matching second type descriptor 944 conveniently include the first portion and only the relevant portion out of the second and the third portions. It should be noted, however, that conveniently in such a situation, the relevant portion will be stored in a location which would be regularly allocated to said portion, and that a location which would be regularly allocated to the non-relevant portion will remained unused, though allocated to the second type descriptor 944, so as regardless of which of the portions of second type descriptor 944 include useful information, the over all memory which is allocated to the second type descriptor 944 will be a second type descriptor size, such as, according to an embodiment of the invention, 512 bit.

Referring now back to FIG. 2. According to an embodiment of the invention, processor 320 is adapted to write into a queued second type descriptor pointer 950 data that is pertaining to the data entity 920 to which the queued second type descriptor points. Conveniently, the writing of additional packet related data into the second type descriptor pointer 950 is carried out in order to save unnecessary accesses to memory unit 330.

Figure 5A:
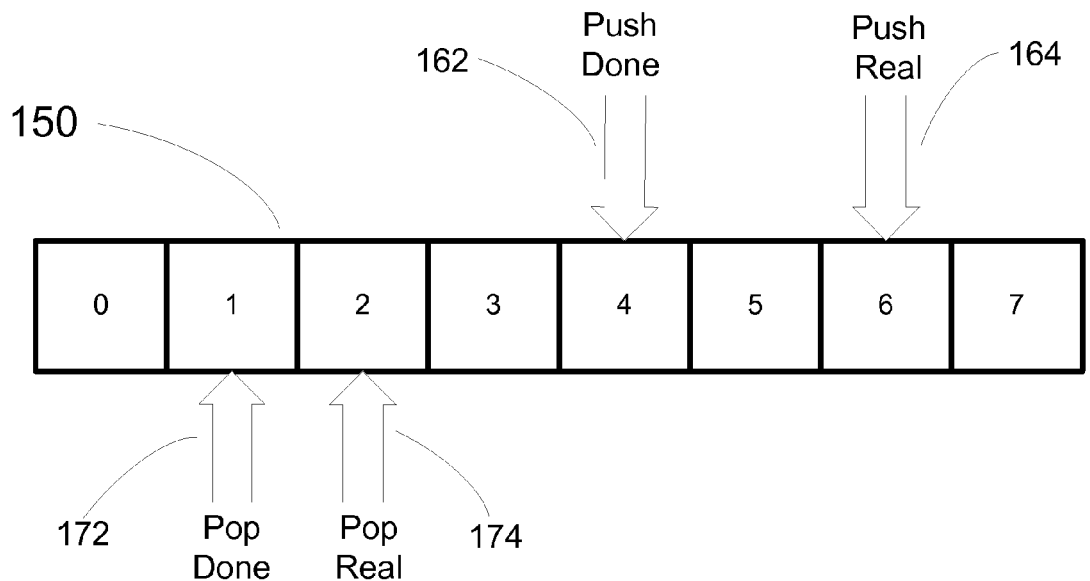
FIG. 5a illustrates a queue, according to an embodiment of the invention.
Figure 5B:
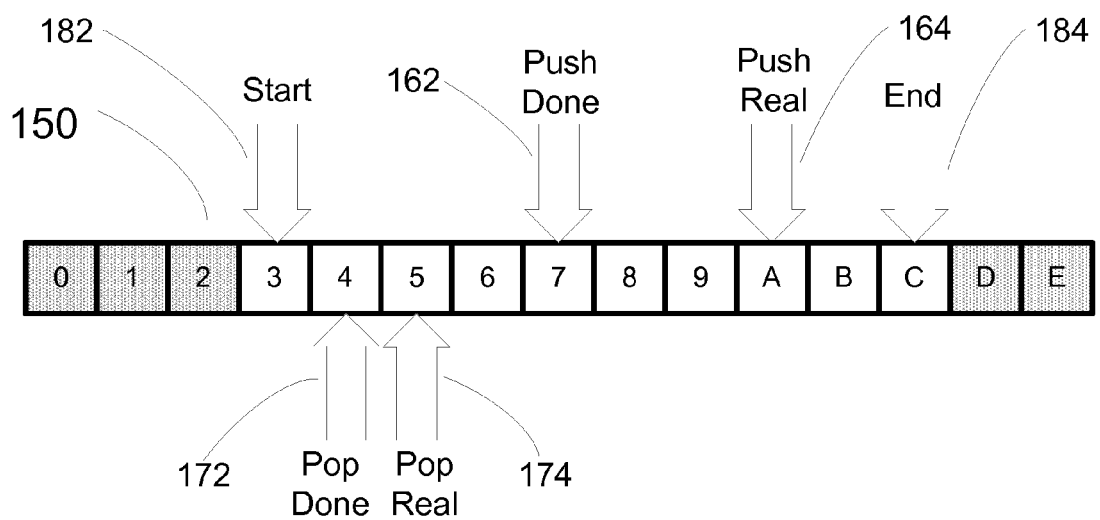
FIG. 5b illustrates a queue, according to an embodiment of the invention.

FIGS. 5a and 5b illustrates queue 150, according to embodiments of the invention. It is noted that the description that refers to FIGS. 5a and 5b benefits from the description of system 300 that is illustrated in FIG. 2. It is noted that according to some embodiments of the invention, and especially inventions in which memory unit 330 is a Synchronous dynamic random access memory double data rate (SDRAM DDR) memory unit, the latency times of memory unit 330 are significant, and can not be ignored from.

The latency times are the delays from the moments in which processor 320 executes a read command or a write command to queue 150 that is stored in memory unit 330, until the arriving of the data that is stored in the data entry, or until the moment in which memory unit 330 successfully stores the data into queue 150 and, according to an embodiment of the invention, acknowledges processor 320. It is noted that according to some embodiments of the invention, latency times grows as the number of queues 150 stored in memory unit 320 grows.

Latency times could be increased when the reading of data from memory unit 330 is carried out in an order which is different from an order which is specified in a read command, so as to optimize the reading in aspects of accessing memory unit 330. This is all the more applicable in embodiment of the invention in which memory unit 330 is a SDRAM DDR. For example, even if a command to read (or to write) data from memory unit 330 is in a x,y,z,w order, processor 320 may decide to read (or to write) the data in a x,z,y,w order.

Due to the latency times of memory, many difficulties arise when trying to implement prior art solutions of queues. There are many durations in which data entries that are marked as read in prior art solutions are not already read, and could be overwritten, and similarly, data entries that are marked as written in prior art solutions are in many durations not written yet, and thus could not be requested from the queue.

According to an embodiment of the invention, processor 320 is adapted to update pointers to data entries stored in queue 150, wherein there are at least four different pointers to data entries, and wherein data entries are, conveniently, first type descriptors 942 and/or second type descriptor pointers 950:

(a) last written pointer 162 (also denoted in FIGS. 5a and 5b as "push-done"), pointing to the last data entry queue 150 that was entirely written to memory unit 330;

(b) last assigned pointer 164 (also denoted in FIGS. 5a and 5b as "push-real"), pointing to a data entry that was added last to queue 150;

(c) last read pointer 172 (also denoted in FIGS. 5a and 5b as "pop-done"), pointing to a data entry that was entirely read from memory unit 330; wherein last read pointer 162 points to the last data entry that was entirely read from memory unit 330; and (d) last requested pointer 174 (also denoted in FIGS. 5a and 5b as "pop-real"), pointing to a data entry that was requested last from queue 150.

Conveniently, according to embodiments of the invention that implement those four types of pointers, processor 320 is adapted to read data and to write data to queues 150 in the manner described below.

In order to write (enqueue) a new data entry into queue 150, processor 320 is adapted to: (a) assign to the new data entry an address in queue 150, in response to the address of the data entry that is stored in last assigned pointer 164, wherein last assigned pointer 164 is updated (incremented) immediately after each writing process. It is noted that last assigned pointer 164 is updated even prior to any actual writing of data to memory unit 330; and (b) transmit the new data entry to memory unit 330, wherein the new data entry is written to memory unit 330 only after a while (which is a latency time of memory unit 330). According to an embodiment of the invention, memory unit 330 is adapted to acknowledge processor 320 regarding the successful writing of the new data entry to queue 150. After the new data entry was successfully written to queue 150, last written pointer 162 is updated (incremented) accordingly.

In order to read (de-queue) a requested data entry from queue 150, processor 320 is adapted to: (a) request the requested data entry which is stored in queue 150 from memory unit 330, in response to the address of the data entry that is stored in last requested pointer 174, wherein last requested pointer 174 is updated (incremented) immediately after each request. It is noted that last requested pointer 174 is updated even prior to any actual reading of data from memory unit 330; and (b) receive the requested data entry from memory unit 330, wherein the requested data entry is received from memory unit 330 only after a while (which is a latency time of memory unit 330). After the requested data entry was successfully read from queue 150, last read pointer 172 is updated (incremented) accordingly.

Furthermore, conveniently, prior to writing the new data entry to queue 150 processor 320 determines a fullness status of queue 150 (i.e. if queue 150 is full or not). According to an embodiment of the invention, processor 320 is adapted to determine the fullness status of queue 150 in response to last assigned pointer 162, and in response to last read pointer 174. This way of determining prevents processor 320 from overwriting data entries stored in queue 150.

In some situations (some of which are described elsewhere in the descriptions of the different drawings), it is desirable that processor 320 will be able to determine an available data entity status of queue 150. According to an embodiment of the invention, processor 320 is adapted to determine the available data entity status of queue 150 in response to last written pointer 164, and in response to last requested pointer 172.

The calculation of statuses of queue 150 is thus achieved by simple comparison functions of two pointers, without necessitating a reading of multiple data entries, as is compulsory in prior art solutions. Some additional processes that are simplified to a great extant by implementing the four pointers 162, 164, 172 and 174 are: (a) writing multiple data entries to queue 150 or reading multiple data entries from queue 150 in a single burst (conveniently facilitated by locating multiple, and especially consecutive, data entries of queue 150 in a single page of memory unit 330); and (b) deleting a full queue 150, or parts of queue 150, by updating the positions of one or more of the four pointers 162, 164, 172 and 174. It is further noted that the specified pointers structure prevent the competition, familiar in prior art solutions, between the process of writing to the queue and the process of reading from the queue.

According to an embodiment of the invention, queue 150 is stored in a memory unit that is adapted to store more data entries than the number of data entries that is included in queue 150. Conveniently, in such embodiments, processor 320 is further adapted to read and/or to update at least one of first data entry pointer 182 (also denoted in FIG. 5b as "start") and last data entry pointer 184 (also denoted in FIG. 5b as "end"). According to an embodiment of the invention, system 300 is adapted to adjust dynamically sizes of one or more queues 150, during an operation of system 300 (such as, though not limited to, in response to a dynamically adjustment command from an operator of system 300, or in response to a status of one or more queues 150).

It should be noted that such an implementation of queue 150 conveniently makes the use of next pointers in the implementation of queue 150 unnecessary, and thus reduces handling time of queue 150, and saves sizes inside first type descriptors 942 and second type descriptor pointers 950. As the size of first type descriptors 942 and second type descriptor pointers 950 is conveniently equal (according to an embodiment of the invention this size is 128 bits), queue 150 is very easy to implement in a way which does not necessitates storing of pointers to other members of the queue inside neither first type descriptors 942 not second type descriptor pointers 950.

Figure 6:
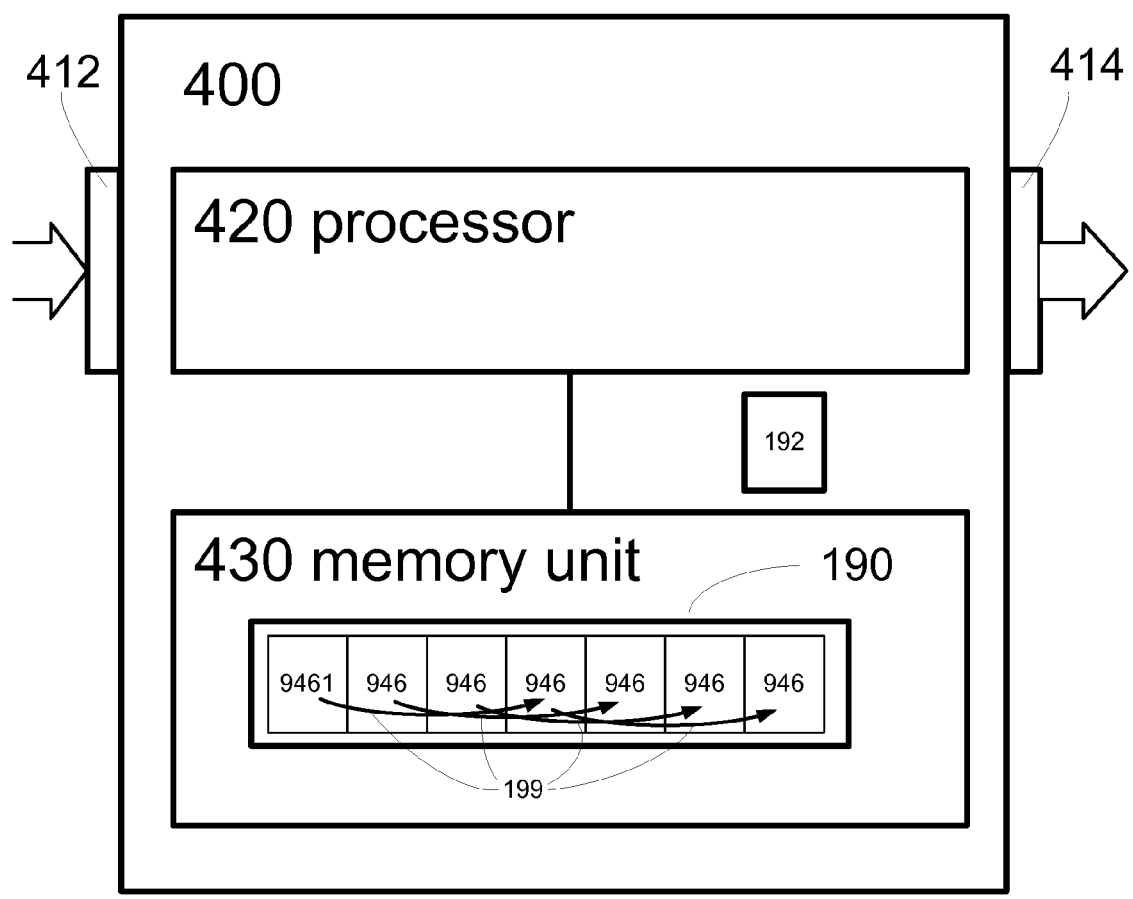
FIG. 6 illustrates a switch, according to an embodiment of the invention

FIG. 6 illustrates switch 400, according to an embodiment of the invention. Switch 400 includes processor 420, which is adapted to de-queue multicasting descriptor 946 from multicasting link-list 190 in response to: (a) a requested number of duplications; (b) a duplications counter; and (c) a rejected duplications counter.

Switch 400 further includes memory unit 430, which is connected to processor 420, and is adapted to maintain multicasting link-list 190. It is noted that different embodiments of switch 400 are adapted to carry out one or more stages of method 700. It is further noted that different embodiments of the invention are further adapted to carry out one or more stages of method 700, and one or more stages of method 600.

It is noted that according to some embodiments of the invention, switch 400 is based on system 300, and some of the different embodiments of switch 400 are equivalent to the described embodiments of system 300, wherein the equivalents of components of system 300 will be clearly recognized by any person skilled in the art by the similar labeling and the similar numbering method used in the describing of switch 400.

According to an embodiment of the invention, memory unit 430 is a double-data-rate synchronous dynamic random access memory unit. According to an embodiment of the invention, the size of the multicasting descriptors 946 is responsive to a burst size of memory unit 430.

Every multicasting descriptor 946 includes data which pertains to multiple destinations of a data entity (it is noted that conventionally, the sending of the same data, and especially of the same packet, to multiple destinations, is known as multicasting). Conveniently, multicasting descriptors 946 include one or more fields which are dedicated to store data pertaining to the multiple destinations. According to an embodiment of the invention, multicasting descriptors 946 include a multicasting bit array, wherein different bits of the multicasting bit array are associated with different destinations.

Conveniently, switch 400 includes multiple queues (not shown), that are associated to the different destinations. Conveniently, every bit of the multicasting bit array is associated to a specific queue, and denotes whether the packet that is to be multicasted should be enqueued to the specific queue (and thus sent to a specific location) or not.

For example, according to an embodiment of the invention, a logical value "1" of every bit signals that a certain packet should be multicasted to the queue that is associated with a certain bit, and a logical value "0" denotes that a certain packet should not be sent to a certain queue.

It is noted that, according to an embodiment of the invention, additional bits of the multicasting descriptor 946 are used for multicasting. For example, and not intending to limit the scope of the invention in any way, the multicasting bit array includes 128 bits, that enable each data entity to be sent to any subgroup of a group of 128 queues of switch 400, wherein additional bits that are stored elsewhere in multicasting descriptor 946 denote one group out of multiple groups of queues 150.

Continuing the same example, switch 400 includes 512 queues, which are divided into four groups of 128 queues each, wherein each packet could be sent to any subgroup of one of the subgroups of queues, using a single multicasting descriptor 946.

According to an embodiment of the invention, the referring to multiple destinations during the multicasting is facilitated by having at least some multicasting descriptors 946 which refer to (rather than include) data which pertains to multiple destinations, which is stored elsewhere. It is noted that, according to an embodiment of the invention, multicasting descriptors 946 are second type descriptors 944, as specified previously.

According to an embodiment of the invention, second type descriptors 944 are structured as illustrated in FIG. 4b, wherein the first portion is 128 bits long and is similar to first type descriptors 942; the second portion is 256 bits long, and is adapted to store additional references to memory buffers, in situations in which the second type descriptor 944 refers to a data entity 920 that is larger than the size of a memory buffer. The third portion of the second type descriptors 944, according to the embodiment of the invention, is a 128 bit vector, which is a multicasting bit array, which is described above. According to an embodiment of the invention, the first portion stores additional bits (such as two additional bits) that indicate one group of queues out of four groups that include 128 queues each.

It is noted that according to an embodiment of the invention, the third portion includes a multicasting bit array pointer to a multicasting bit array, which is stored elsewhere in memory unit 430. According to the herein mentioned example, the multicasting bit array which is stored outside multicasting descriptor 946 is 512 bits long, wherein each bit of the 512 bits of the multicasting bit array pertains to a single queue out of the queues of switch 400.

It should be noted that having the size of the multicasting bit array equal to the size of multicasting descriptor 946 (and thus conveniently to the size of second type descriptor 944) facilitates more efficient a handling of the memory of switch 400, for, as aforementioned, the memory unit of switch 400 is conveniently adapted to store data structures of the size of second type descriptors 944. Thus, memory is not wasted, and the reading of the multicasting bit array is faster.

According to another embodiment of the invention, the multicasting bit array pointer is stored in the second portion, wherein second type descriptor 944 includes only the first portion and the second portion.

Embodiments of the invention in which second type descriptors 944 include a multicasting bit array pointer are more flexible than embodiments that includes a 128 bits long multicasting bit array and a group of queues indicating bits, because those embodiments facilitates the multicasting of packages to any subgroup of the entire 512 queues of switch 200.

Conveniently, when reading a multicasting descriptor 946 (which is conveniently though not necessarily a second type descriptor 944) from multicasting link-list 190, processor 420 is adapted to initially only read the first portion, in order to expedite the reading. Since on many occasions, only one of the second portion and the third portion of a second type descriptor includes useful information, according to an embodiment of the invention processor 420 is adapted to store in the first portion bits that are indicative of the usefulness of the data stored in the other two portions.

Conveniently, switch 400 includes one or more input ports 412, and one or more output ports 414. It is noted that according to an embodiment of the invention, at least some ports (not shown) of switch 400 are input/output ports, that are adapted both for reception of data and for transmission of data.

Conveniently, processor 420 is adapted: (a) to receive packets of data, at least some of which are to be multicasted, via input port 312, (b) to create a data entity (not shown) that stores the payload of each packet, and (c) to generate a multicasting descriptor 946, that refers to the respective data entity. According to an embodiment of the invention, processor 420 is further adapted to enqueue multicasting descriptors 946 to multicasting link-list 190 of switch 400, and to enqueue either first type descriptors 942 or second type descriptor pointers 950 to the different queues of switch 400, wherein the first type descriptors 942 and/or the second type descriptor pointers 950 refer either to the multicasting descriptors 946 or to data which is referred by those multicasting descriptors 946.

It is noted that, conveniently, processor 420 is adapted to enqueue a multicasting descriptor 946 into multicasting link-list 190 only after an end-of-packet signal was arrive for the respective received packet.

According to an embodiment of the invention, multicasting link-list 190 is a link-list of multicasting descriptors 946, wherein multicasting descriptors 946 that are stored in multicasting link-list 190 store a next multicasting descriptor pointer (not shown) to a next multicasting descriptor 946 in multicasting link-list 190. Conveniently, processor 420 is adapted to read and/or to update a first multicasting descriptor pointer (not shown) and a last multicasting descriptor pointer (not shown).

It is noted that according to an embodiment of the invention in which a first portion of the multicasting descriptors 964 is similar to a first type descriptor 942 which are described above, the next multicasting descriptor pointer is stored in the first portion. This is conveniently carried out to save accesses to memory unit 430.

It is noted that on some situations, many of the packets that are received by switch 400 are small packets, according to an embodiment of the invention, the multicasting descriptors 946 that are stored in multicasting link-list 190 stores a further multicasting descriptor pointer 199 to a multicasting descriptor 946 that is a predetermined number of multicasting descriptors 946 ahead in multicasting link-list 190.

For example, in the embodiment of the invention that is illustrated in FIG. 6, every multicasting descriptor 946 that is stored in multicasting link-list 190 stores a further multicasting descriptor pointer 199 to a multicasting descriptor 946 that is three multicasting descriptors 946 ahead (as illustrated by the curved arrows).

Such an embodiment of the invention also facilitate reducing the number of accesses to memory unit 430, as multiple multicasting descriptors 946 could be read by processor 420 in one access. It will be clear to any person that is skilled in the art that such an embodiment of the invention may necessitate processor 420 to be further adapted to read and/or to update multiple first multicasting descriptor pointers. It is clear to any person skilled in the art that next multicasting descriptor pointer are essentially further multicasting descriptor pointers 199 that points do a multicasting descriptor 946 that is one place further.

According to an embodiment of the invention, processor 420 is adapted to store the further multicasting descriptor pointer 199 during the generation of each multicasting descriptor 946, in order to save an additional future access to memory unit 430. However, as processor 420 is conveniently also adapted to enqueue a multicasting descriptor 946 into multicasting link-list 190 only after an end-of-packet signal was arrive for the respective received packet, some times, according to such an embodiment of the invention, there is a need to update the further multicasting descriptor pointer 199, in situations in which packets that are to be multicasted are enqueued to multicasting link-list 190 in an order that is different than the order in which they were initially received.

This situation requires an additional access to memory unit 430, but it is clear to any person skilled in the art that if the packets received by switch 400 are short, this situation does not occur, as the order of the packets is kept, and if the packets received by switch 400 are relatively long, the additional access is negligible in relation to the handling of the long packet.

In order to multicast a data entity that is referred to by first multicasting descriptor 9461 (which is conveniently the first multicasting descriptor 946 in multicasting link-list 190), processor 420 is adapted, according to different embodiments of the invention, to: (a) enqueue a first type descriptor 942 to a queue of switch 400 that is referred to by first multicasting descriptor 9461, or, if the received packet is long, to (b) enqueue a multicasting descriptor pointer (not shown) that points to first multicasting descriptor 9461, to a queue of switch 400 that is referred to by first multicasting descriptor 9461. Conveniently, processor 420 is further adapted to send data entities from the different queues (which, according to some embodiment of the invention, are queues 150) to their different destinations, via one or more output ports 414.

It is noted that, according to an embodiment of the invention, processor 420 is adapted to enqueue first type descriptor 942 to a queue of switch 400 in order to multicast data entities that are smaller than a second size threshold, and to enqueue a multicasting descriptor pointer to a queue in order to multicast data entities that are larger than the second size threshold. It is noted that according to an embodiment of the invention, multicasting descriptor pointers are second type descriptor pointers 950.

It is clear to any person skilled in the art that is desirable that switch 400 will dequeue first multicasting descriptor 946₁ and discard the data entity to which first multicasting descriptor 946₁ refers once a certain data entity was multicasted.

It should be noted, that commonly, a multicasting descriptor 946 is not moved nor discarded, because it waits to the relevant multicasting to be carried out, while it is no longer a part of multicasting link-list 190.

After second type descriptor pointers 950 which refer to a certain multicasting descriptor 946 have been queued to the relevant queues, the multicasting descriptor 946 could not be deleted or moved until the multicasting is over, so data will not be lost. However, it does no longer form a part from multicasting link list 190, as it demands no further processing in order to queue information into the queues.

It should be noted that using a dynamic memory allocation such as in multicasting link-list 190 facilitates utilization of a multicasting descriptor 946 after it had been dequeued form multicasting link-list 190, without having to copy or to move it.

According to an embodiment of the invention, processor 420 is further adapted to generate multiple multicasting descriptor pointers which point to a multicasting descriptor 946 which was dequeued from multicasting link-list 190, and to discard the multicasting descriptor 946 in response to (a) the requested number of duplications; (b) the duplications counter; and (c) the rejected duplications counter.

Conveniently, switch 400 is adapted to decide when to de-queue first multicasting descriptor 946₁ and to discard a certain data entity in response to: (a) a requested number of duplications; and (b) a duplications counter.

It is noted that during the multicasting of large data entities, according to an embodiment of the invention, first multicasting descriptor 946₁ stores the only reference to a certain data entity, and therefore could not be deleted (or de-queued) before the certain data entity was sent to all the destinations.

According to an embodiment of the invention, during the multicasting of relatively short packages (such as shorter from a third size threshold, which is according to an embodiment of the invention, 128 byte), references to the data entities are stored also in the first type descriptors which are duplicated to the different queues, and thus do not require additional readings of the multicasting descriptor 946.

Conveniently, switch 400 is adapted to update the duplication counter whenever a duplicated first type descriptor 942 is de-queued from a queue of switch 400 after the referred data entity was successfully duplicated to a destination, or, if a certain data entity is a large data entity, whenever a multicasting descriptor pointer is de-queued from a queue of switch 400 after the referred data entity was successfully duplicated to a destination.

However, the procedure that is described above is only applicable if all the duplications of said data entity are successful. According to an embodiment of the invention, processor 420 is adapted to decide, for at least a portion of the queues of switch 400, whether to admit or to deny each first type descriptor or each multicasting descriptor pointer to the queue to which it is assigned. It is noted that, conveniently, processor 420 denies first type descriptors or multicasting descriptor pointers from being enqueued into a queue when the transmission rate of that queue (or of the output port 414 to which that queue is associated) exceeds a predetermined transmission rate threshold that is assigned to that queue (or to said output port 114).

It is clear to any person skilled in the art that, if one or more of the multicasting descriptor pointers or if one or more of the duplicated first type descriptors are denied from the queues to which they are assigned, than the packet will be duplicated less times than the requested number of duplications. Therefore, in such embodiments, switch 400 must be further adapted to decide when to de-queue first multicasting descriptor 946₁ and to delete the data entity to which first multicasting descriptor 946₁ refers in response to: (a) the requested number of duplications; (b) the value of the duplications counter; and (c) a value of the rejected duplications counter, wherein the rejected duplications counter is indicative of the number of multicasting descriptor pointers that were denied, and, according to an embodiment of the invention, to a number of duplications that failed as a result from other reasons. It is noted that, according to an embodiment of the invention, processor 420 is further adapted to store inside a multicasting descriptor 946 a value of at least one of: (a) a requested number of duplications; (b) a duplications counter; and (c) a rejected duplications counter.

In order to successfully de-queue first multicasting descriptor 946₁ from multicasting link-list 190, processor 420 must obtain the value of the rejected duplications counter.

According to an embodiment of the invention, switch 400 is adapted to store values of the failed duplication counter in the duplicated first type descriptors 942. According to an embodiment of the invention, switch 400 is adapted to store values of the failed duplication counter in the multicasting descriptor pointers. According to an embodiment of the invention, switch 400 further includes multicasting buffer 192, that is adapted to store either a duplicated first type descriptor 942 or a multicasting descriptor pointer, wherein each duplicated first type descriptor 942 and/or each multicasting descriptor pointer that are generated and are approved by processor 420 to be admitted into the relevant queue are initially stored in multicasting buffer 192.

The stored duplicated first type descriptor 942 or a multicasting descriptor pointer is conveniently provided to the relevant queue only after processor 920 had approved another duplicated first type descriptor 942 or a multicasting descriptor pointer to be admitted to a relevant queue, wherein processor 420 updates the value of the rejected duplications counter, which is conveniently stored in the duplicated first type descriptor 942 or a multicasting descriptor pointer that is buffered in multicasting buffer 192. Once there are no more duplications to carry out, processor 420 reads the value of the rejected duplications counter from the duplicated first type descriptor 942 or a multicasting descriptor pointer that is buffered in multicasting buffer 192 before providing it to the relevant queue.

Prior to enqueuing the last duplicated first type descriptor 942 or a multicasting descriptor pointer that was buffered in multicasting buffer 192. Conveniently, processor 420 is adapted to determine the actual number of duplications needed, in response to the requested number of duplications and to the rejected duplications number. Switch 400 is than adapted to de-queue first multicasting descriptor 946₁ and to discard the data entity that is referred by the first multicasting descriptor 946₁ once the numbers of duplications equals the actual number of duplications needed.

According to an embodiment of the invention, switch 400 is further capable of transmitting unicast packets to a single destination, wherein conveniently, processor 420 is adapted to provide one or more unicast packets to a queue without creating a multicasting descriptor 946 for that unicast packet. According to an embodiment of the invention, switch 400 is further capable of transmitting at least one packet to a small numbers of destinations without creating a multicasting descriptor 946 for said packet, by creating either a first type descriptor 942 or a second type descriptor pointer 950 that refers to a second type descriptor 944, and duplicating the either first type descriptor 942 or the second type descriptor pointer 950 to a small number of queues which are associated with the small number of destinations.

Conveniently, switch 400 is adapted to prioritize unicast transmissions over multicast transmissions aimed to a large number of destinations. According to an embodiment of the invention, switch 400 is further adapted to prioritize multicast transmissions aimed to a small number of destinations over unicast transmissions.

According to an embodiment of the invention, switch 400 is adapted to provide duplicated first type descriptors 942 or multicasting descriptor pointers to queues in response to a multicasting descriptor 946 only when there is no unicast traffic. Conveniently, processor 420 is adapted to postpone duplication if a unicast packet arrives, and to continue duplication only when there is once again no unicast traffic.

According to different embodiments of the invention, the duplication counter and/or the rejected duplication counters are stored in different locations, such as, though not limited to, inside the relevant multicasting descriptor 946, inside on or more of the second type descriptor pointers 950 which refer to the relevant multicasting descriptor 946, or inside a dedicated counter.

It is noted that, according to an embodiment of the invention, switch 400 further includes one or more dedicated counters (not shown), which operates either as a duplication counter or as a rejected duplications counter in any given time. Conveniently, according to such an embodiment of the invention, switch 400 includes a multitude of dedicated counters (such as, by way of example only, 1024 dedicated counters).

It is further noted that conveniently, the using of dedicated counters is much faster than reading and writing counting information inside a second type descriptor 946 or inside a second type descriptor pointer 950.

According to an embodiment of the invention, processor 420 is adapted to generate and to enqueue into the queues of switch 400 first type descriptors 942 which refer to the data which is referred to by a multicasting descriptor 946, in cases the data is smaller than the third size threshold.

It would be clear to a person who is skilled in the art that for very short packets, it is wasteful to refer back to the multicasting descriptor 946, and it is more efficient to refer to the data directly by multiple first type descriptors which are stored in the queues.

However, in such cases the multicasting descriptor 946 is discarded before the last duplication of the data has been sent, and in order to free the memory in which the data is stored, there is a need to use one or more dedicated counters which are described above.

Figure 7:
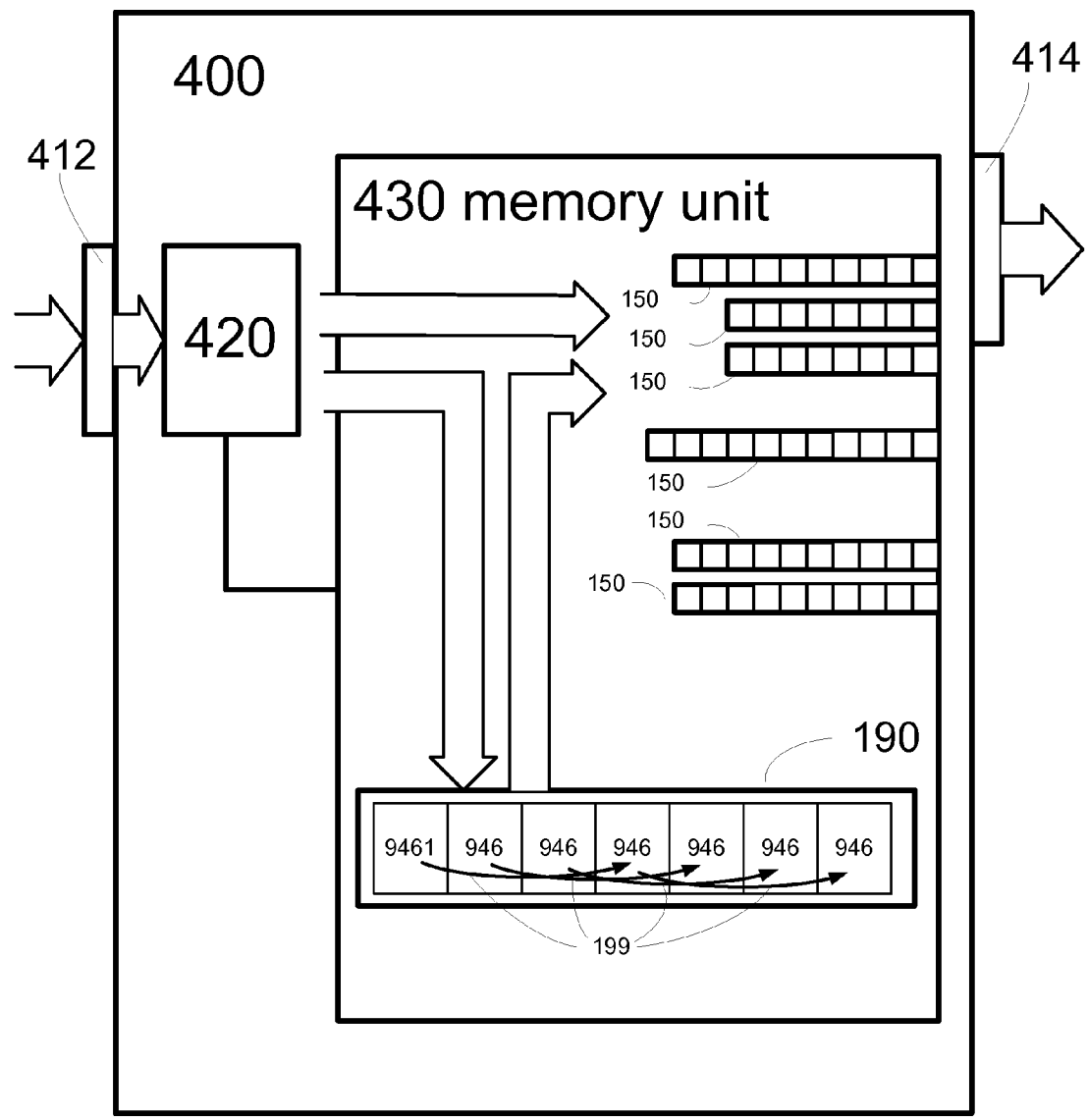
FIG. 7 is a block diagram of a switch, according to an embodiment of the invention.

FIG. 7 is a block diagram of switch 400, according to an embodiment of the invention. Switch 400 which is illustrated in FIG. 7 is similar to the one which illustrated in FIG. 6, but wherein multiple queues 150 are illustrated. According to an embodiment of the invention, whenever a packet is received by switch 400, processor 420 is required to determine where to enqueue a descriptor (or a pointer thereto) which refers to a payload of the data.

Conveniently, if the packet which is received is addressed to a single destination or to a limited number of destinations, processor 420 generates a first or a second type descriptor which refers to the payload of the packet, and enqueue the first type descriptor 942 or a second type descriptor pointer 950 into one or more of queues 150. This is conveniently carried out when the packet is a unicast packet, or a packet which is to be multicasted to a limited number of destination (usually, though not necessarily, not more than three destinations).

Processor 420 conveniently generates a multicasting descriptor 946 for a packet which is to be multicasted, and enqueue the multicasting descriptor 946 into multicasting link-list 190. As explained in length in the detailing of the relevant figures, ones processor 420 decides that a multicasting descriptor 946 is to be processed (conveniently when neither unicast packets nor packets which are to be multicasted to a limited number of destinations are received by switch 400), processor 420 than generates second type descriptor pointers 950 and enqueue them in the relevant queues 150.

Figure 8:
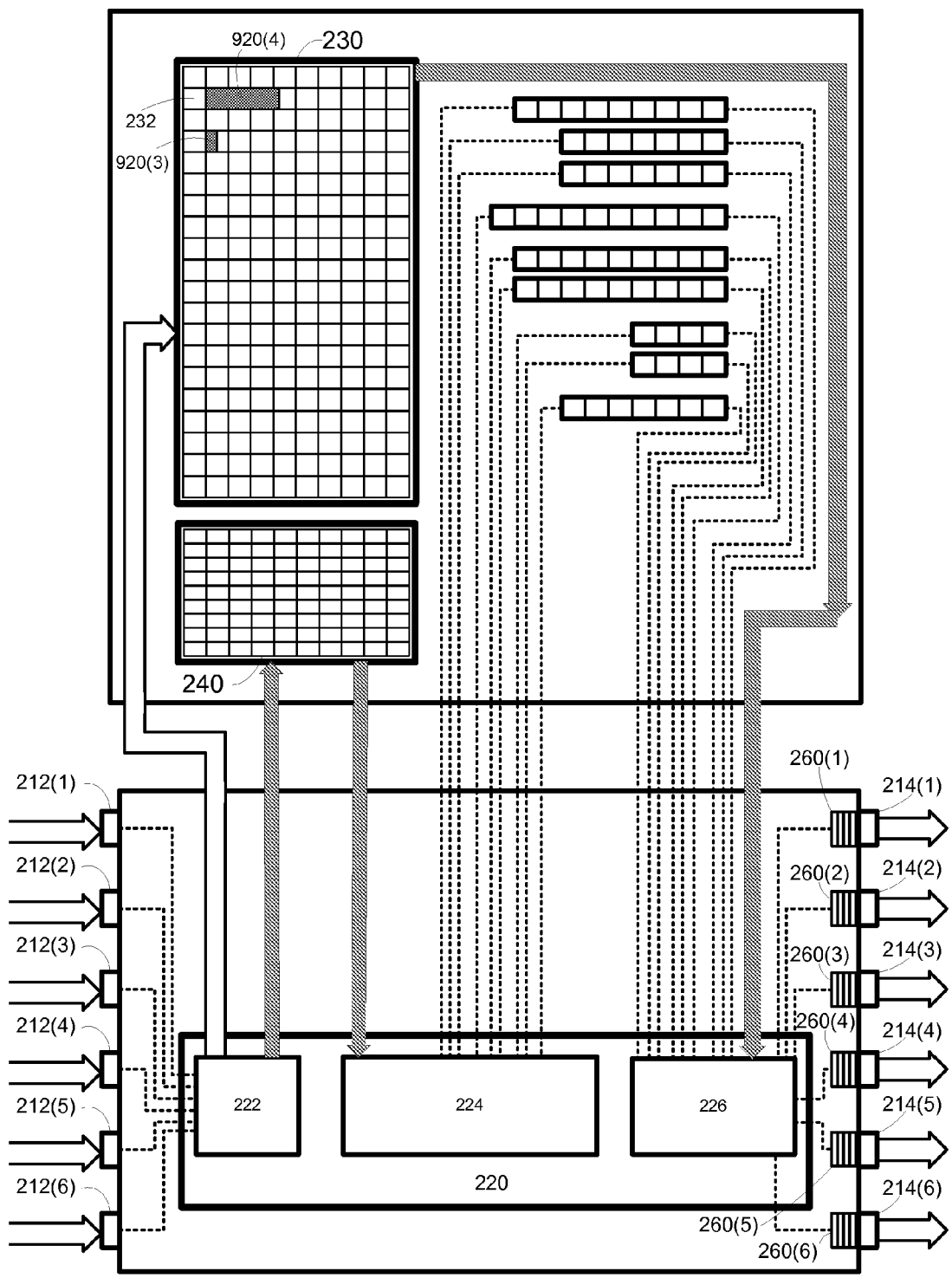
FIG. 8 is a block diagram of a switch, according to an embodiment of the invention.

FIG. 8 is a block diagram of switch 200, according to an embodiment of the invention. Switch 200 includes processor 220 which is adapted to generate first type descriptors 942, second type descriptors 944 and second type descriptor pointers 950; wherein the first type descriptors 942 and the second type descriptors 944 describe data entities 920 received by switch 200, and wherein a size of a second type descriptor pointer 950 equals a size of a first type descriptor 942; and memory unit 230 that is connected to processor 220, and is adapted to maintain at least one queue 150 that stores at least one first type descriptor 942 and at least one second type descriptor pointer 950. It is noted that different embodiments of switch 200 are adapted to carry out one or more stages of method 600. It is further noted that different embodiments of switch 200 are further adapted to carry out one or more stages of method 600, and one or more stages of method 700. It is noted that according to different embodiments of the invention, switch 200 is adapted to run at least a portion of the computer code that is described below.

Switch 200 is based on system 300, and some of the different embodiments of switch 200 are equivalent to the described embodiments of system 300, wherein the equivalents of components of system 300 will be clearly recognized by any person skilled in the art by the similar labeling and the similar numbering method used in the describing of switch 200.

In order to clarify the invention, numerical values will be used to exemplify an embodiment of the invention. It is stressed that all the numerical values are herein offered by way of example only, and not intending to limit the scope of the invention in any way whatsoever. It will be further understood by any person skilled in the art that either similar or different values could be used in different embodiments of either switch 200 or any embodiments of system 300.

According to an embodiment of the invention, memory unit 230 is a double data rate synchronous dynamic random access memory unit, which is divided into four banks, and wherein each bank is divided to memory pages of 1 kilobytes.

Conveniently, memory unit 230 is further adapted to store data entities 920. Different embodiments of the invention are adapted to utilize this structure of memory unit 230, such as but not limited to storing queues 150 into consecutive memory pages, and dividing the storing of one or more queues 150 and of one or more data entities 920 between different banks of memory unit 230, in order to achieve more efficient a reading of data from memory unit 230.

According to an embodiment of the invention, switch 200 includes 128 input/output ports, that are adapted both for reception of data and for transmission of data. It is noted that in order to simplify and to clarify the explanation, FIG. 8 illustrates each of the input/output ports as being constructed from separated input port and output ports.

According to an embodiment of the invention, switch 200 includes 512 queues 150, wherein each queue is adapted to store 128 bits long data entries, each of which is either a first 128 bits long first type descriptor 942 or a 128 bits long second type descriptor pointer 950, which points to a 512 bits long second type descriptor 944. Conveniently, for every input/output port of switch 200 to which several queues 150 are associated, a priority is assigned for every queue 150, wherein processor 220 is adapted to send data entities via the input/output port in response to the order of queues priorities.

According to an embodiment of the invention, the queues 150 are similar to those illustrated in FIGS. 5*a* and 5*b*, and that descriptions of which are offered above. Conveniently, all the pointers 162, 164, 172, 174, and according to some embodiments of the invention, 182 and 184 are stored in processor 220, which is implemented on a field-programmable gate array chip.

It is noted that, according to an embodiment of the invention, processor 220 is adapted to update date and to store new data to first type descriptors 942 and to at least one of the different portions, and especially to the first portion, of the second type descriptors 944, during the processing of each packet, from the receiving to the sending. The updated data or the new data may sometimes be overwritten over data which is no longer necessary. It is noted that, according to an embodiment of the invention, processor 220 is further adapted to update date or to store new data into second type descriptors pointers 950.

Conveniently, processor 220 is adapted to decide which type of a descriptor to generate for each received packet in response to both the first size and the second size thresholds that were described above, wherein, according to an embodiment of the invention, the first size threshold is 128 bytes, and the second size threshold is 2 kilobytes.

It is further noted that conveniently, processor 220 is adapted to provide a second type descriptor pointer 950, which refers to a second type descriptor 944, to a queue 150 only after receiving an end-of-packet signal for the respective packets. This features is beneficial in at least three aspects: ordering the packets to be sent by the time in which they arrived in full; making sure that a packet had arrived successfully before referring to it in a queue 150, and preventing situations in which processor 220 attempts to send a packet that had not fully arrived.

Conveniently, processor 220 includes packet processor 222 which is adapted to decide whether to admit or to deny a data entry that references to a packet to a queue 150, wherein packet processor 222 is adapted to carry out said decisions both for unicast packets, for multicasting packets that are aimed to a large number of destinations, and for multicast packets which are aimed to a small number of destinations.

It is noted that typically packet processor 222 admits all or most of the multicast packets which are aimed to a small number of destinations, because this feature is used on many occasions for packet sniffing by an operator of switch 200. It is noted that, conveniently, packet processor 222 is further adapted to discard data pertaining to denied packets from memory unit 230. It is further noted that according to some embodiments of the invention, processor 220 is adapted to support multicasting of packets to a small number of destinations only for packets that are smaller than the first size threshold.

According to an embodiment of the invention, processor 220 includes packet builder 226, which is adapted to send packets to their destinations via the different input/output ports. According to an embodiment of the invention, switch 200 further includes multiple conveyance queues 260 such as conveyance queues 260(1) through 260(6), wherein each conveyance queue 260 is associated to a single input/output port.

Processor 220 is adapted to read data entries from the queues 150 and to responsively write first type descriptors 942 to the conveyance queue 260 associated with the relevant queue 150, wherein this process is conveniently carried out in response to the different queues priorities of the queues 150 which are associated which each of conveyance queues 260. Conveniently, each of the conveyance queues 260 is adapted to store a limited number of first type descriptors 942, such as, according to an embodiment of the invention, four first type descriptors 942. It is noted that, according to an embodiment of the invention, packet builder 226 is adapted to read multiple data entries (or portions of which) in a single reading.

Conveniently, packet builder 226 is further adapted to generate metadata 920 for each of the data entities 920 prior to sending the data entities 920 to their destinations. Packet builder 226 is adapted to read the first type descriptors 942 from the different conveyance queues 260 in response to an access algorithm (such as, but not limited to, a round robin algorithm. In situations in which different priorities are assigned to different queues 150, the access algorithm is conveniently responsive to the priorities of the different queues 150. Moreover, different input/output port priorities could be assigned to the different input/output ports, wherein the access algorithm is further responsive to the input/output ports priorities).

Conveniently, packet builder is further adapted to check every accessed conveyance queue 260, if it is empty, wherein in such case packet builder 226 proceeds to access conveyance queues 260 according to the access algorithm, or else, if the accessed conveyance queue 260 stores at least one first type descriptor 942, packet builder 226 reads the first of the first type descriptors 942 that are stored in the accessed conveyance queue 260, creates a metadata, in response to information included in the first type descriptor 942 and in data entity 920 to which the first type descriptor 942 refers, creates a new packet from said data entity 920 and the created metadata, and provide the new packet to the input/output port that is specified in the first type descriptor 942, to be transmitted to the destination of the packet.

According to an embodiment of the invention, at least some conveyance queues 260 are further adapted to store second type descriptor pointers 950, wherein in situations in which packet builder 226 is encountered with a second type descriptor pointer 950, it is conveniently adapted to send a request for the second type descriptor 944, and to mark the second type descriptor pointer 950 to be skipped by the access algorithm, until the pointed second type descriptor 944 is provided.

In situations in which packet builder 226 encounters a second type descriptor 944, processor 220 is adapted to not to delete the second type descriptor 944 even though it was de-queued from the respective queue 150, and packet builder 226 is adapted to keep requesting additional references to memory buffers that stores the respective data entity 920. According to an embodiment of the invention, packet builder 226 is adapted to request the next reference prior to the completion of the reading of the previous part, in order to expedite the reading.

Figure 9:
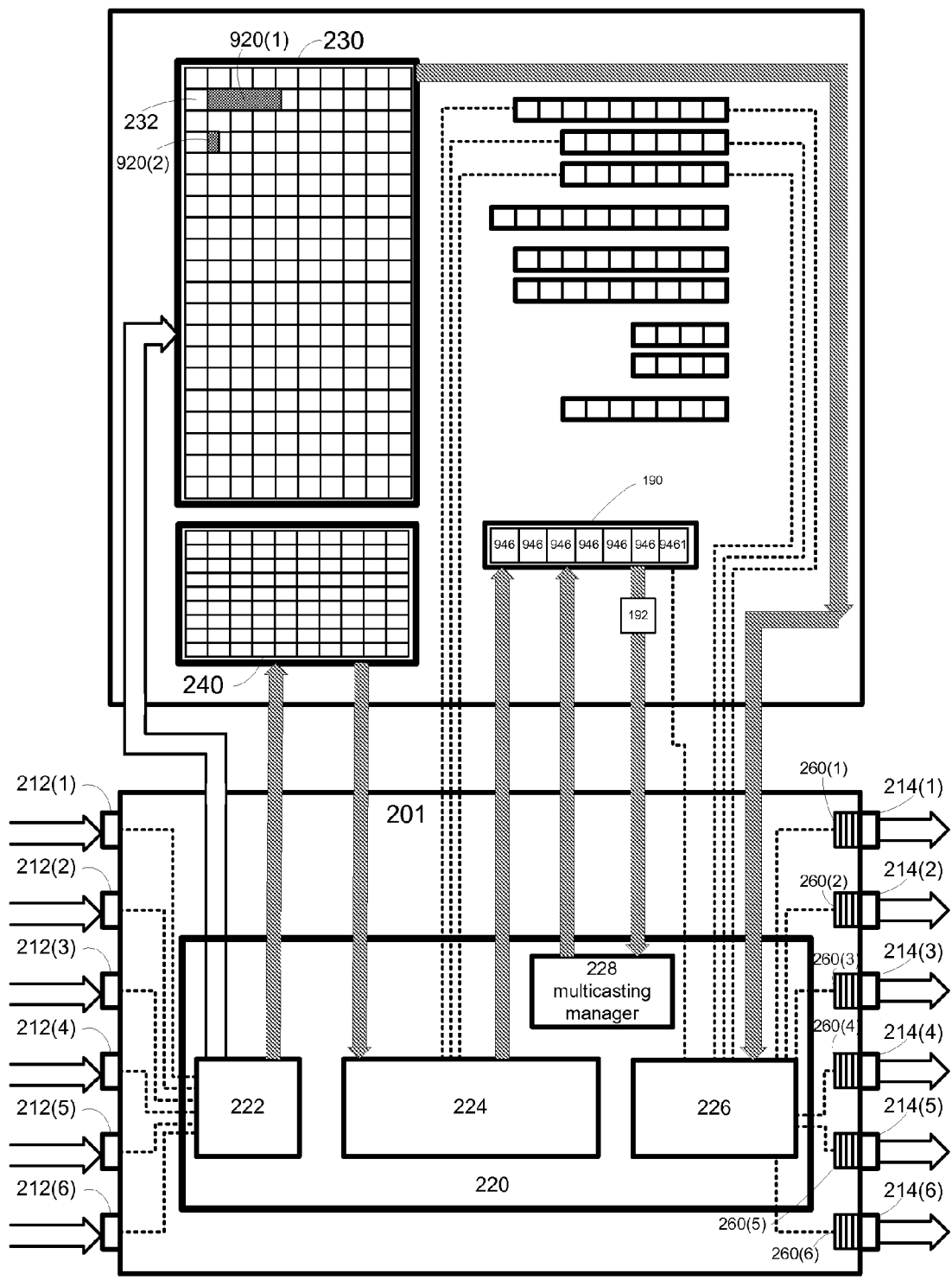
FIG. 9 is a block diagram of a switch, according to an embodiment of the invention.

FIG. 9 is a block diagram of switch 201, which is an embodiment of switch 200. Switch 201 further includes multicasting manager 228, which is included in processor 220, and is adapted to carry out multicasting associated actions, and specifically, at least some of the stages of method 700. Switch 201 further includes multicasting link-list 190 and multicasting buffer 192, descriptions of both of which are offered in the description of FIG. 6. It is noted that different embodiments of switch 201 are adapted accordingly with different adaptations that are facilitated by the different embodiments of switch 400, which are described in detail in the description to FIG. 6. It is noted that different embodiments of system 300 are adapted to carry out one or more stages of method 600. It is further noted that different embodiments of the invention are further adapted to carry out one or more stages of method 600, and one or more stages of method 700.

Figure 10:
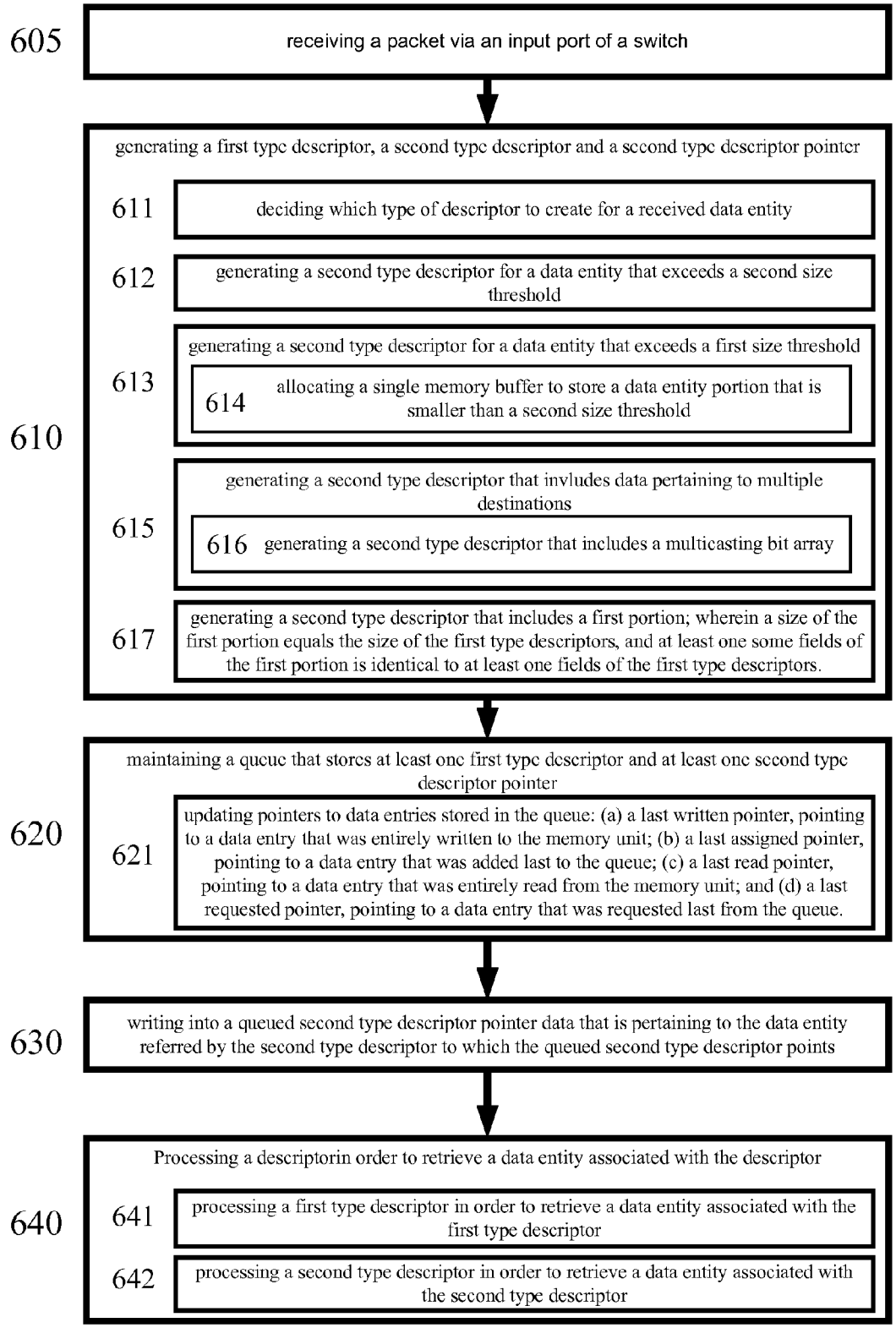
FIG. 10 illustrates a method for queuing descriptors, according to an embodiment of the invention.

FIG. 10 illustrates method 600 for queuing descriptors, according to an embodiment of the invention. It should be noted that according to some embodiments of the invention, method 600 is carried out by one or more of systems 200, 300 and 400 which are described above, and which are adapted to carry out method 600 on top of the different embodiments which are described above. According to some embodiments of the invention, the system which carries out method 600 is further adapted to carry out some or all of the stages of method 700.

According to an embodiment of the invention, stage 600 starts with stage 605 of receiving a packet via an input port of a switch. Referring to the examples set forward in the previous drawings, stage 605 is conveniently carried out by system 200; wherein system 200 is a switch.

Stage 605 is followed by stage 610 of generating a first type descriptor, a second type descriptor and a second type descriptor pointer, wherein the first type descriptors and the second type descriptors describe data entities received during the receiving, and wherein a size of a second type descriptor pointer equals a size of a first type descriptor.

Referring to the examples set forward in the previous drawings, stage 610 is conveniently carried out by processor 320.

Conveniently, stage 610 starts with stage 611 of deciding which type of descriptor to create for a received data entity, wherein, according to an embodiment of the invention, the deciding is carried out in response to a size of the data entity. According to some of the embodiments of the invention, stage 611 determines which of the others steps of stage 610 will be carried out. It is noted that according to other embodiments of the invention, other decision rules are used in the deciding.

Figure 11:
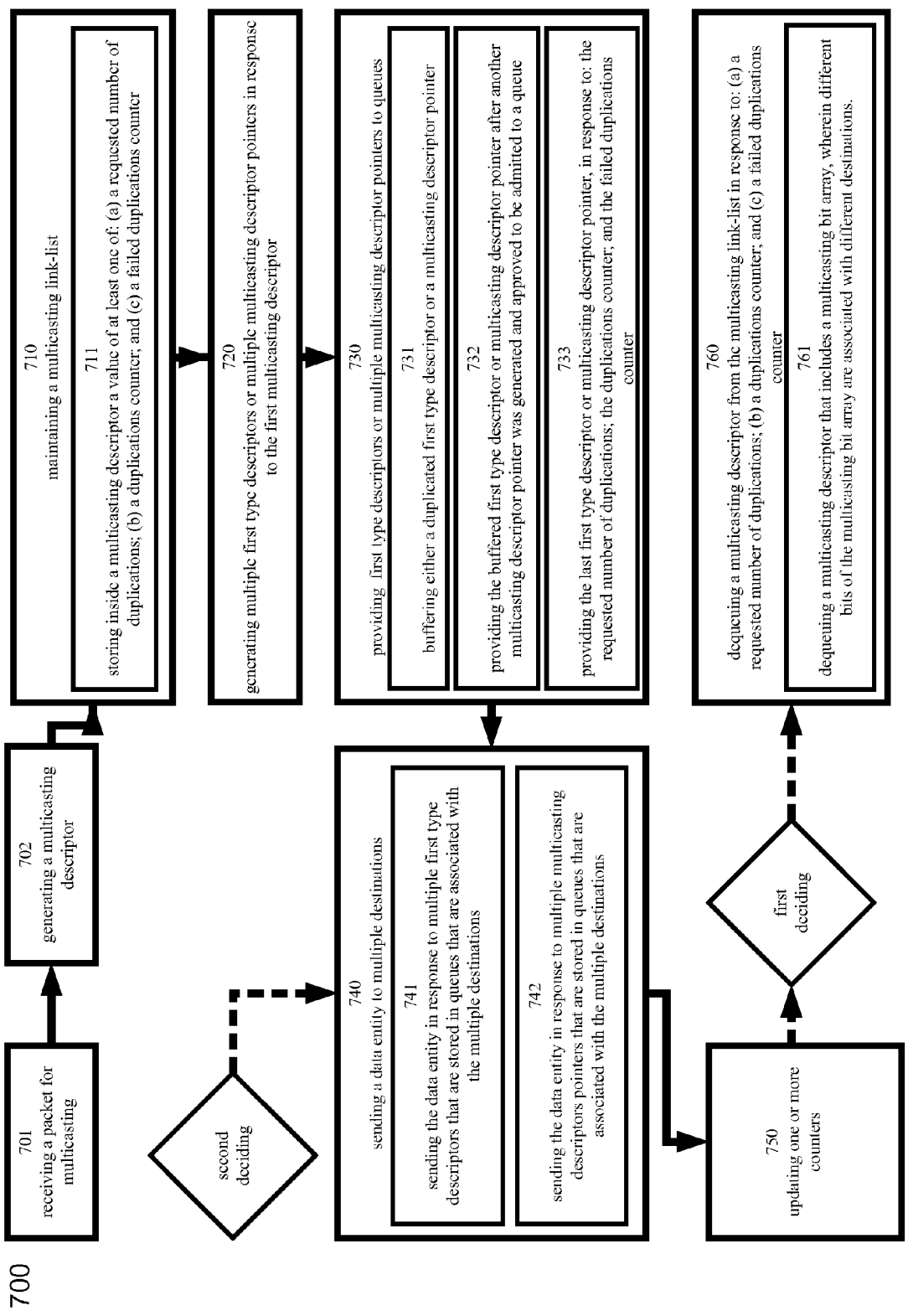
FIG. 11 illustrates a method for transmitting packets, according to an embodiment of the invention.

Conveniently, the deciding of stage 611 is responsive to the number of destinations to which the packet is addressed, wherein conveniently, each packet could be one of unicast packet which is addressed to a single port, a multicast packet which is addressed to a limited number of ports (usually, though not necessarily, not more than three destinations), and a multicast packet which is addressed to multiple ports. The following stages of stage 610 expand of the deciding, according to some of the embodiments of the invention. It is recommended to view method 600, and especially stage 610, in relation to both switch 400 which is illustrated in FIG. 7, and to method 700 which is illustrated in FIG. 11.

According to an embodiment of the invention, stage 610 includes stage 612 of generating a second type descriptor for a data entity that exceeds a second size threshold. Conveniently, the second size threshold is responsive to a size of one or more memory buffers of a memory unit that stores said data entity (which may and may not be a memory unit that is used during stage 620 of maintaining that is described below, according do different embodiments of the invention). It is noted that according to an embodiment of the invention, the second size threshold is responsive to long data entities.

According to an embodiment of the invention, the second size threshold (and, according to an embodiment of the invention, the size of the one or more memory buffers of the memory unit that stores that data entity) is determined so as to facilitate an efficient handling of long data entities. According to an embodiment of the invention, the second size threshold refers to packets which are larger than 2 kilobytes.

It is noted that according to some embodiments of the invention, first type descriptors are smaller than second type descriptors, and thus, according to some embodiments of the invention, can refer only to data entities of a limited size. According to an embodiment of the invention, first type descriptors can only refer to data entities that are smaller than the second size threshold, and therefore stage 612 is carried out in such situations in said embodiments of the invention.

According to an embodiment of the invention, stage 610 includes stage 613 of generating a second type descriptor for a data entity that exceeds a first size threshold, that is smaller than the second size threshold, and, according to an embodiment of the invention, is also smaller than the size of one or more memory buffers of the memory units that stores that data entity. According to an embodiment of the invention, the first size threshold is responsive to short data entities.

It is noted that, conveniently, the carrying out of the stages of maintaining and processing, which are described below, is easier for first type descriptors than second for type descriptors (for reasons such as, though not limited to, size differences between the two types of descriptors, and the additional actions required to read the second type descriptor pointer and than the second type descriptor). Nevertheless, according to some embodiments of the invention, in some situations it is advantageous to generate a second type descriptor for a data entity rather than to generate a first type descriptor for said data entity, even in situations in which a first type descriptor is sufficient to refer to the data entity.

According to an embodiment of the invention, stage 613 includes stage 614 of allocating a single memory buffer to store a data entity portion that is smaller than the second size threshold; wherein the first size threshold is smaller than the second size threshold. Conveniently, at least some of the packets that are received during stage 605 are not received as one continuous uninterrupted bulk of data, but rather divided into shorter communication packets (not shown), that arrives over a span of time, not necessarily successive to one another, wherein the receiving conveniently includes reconstructing each packet that was divided, from the shorter communication packets. Conveniently, all of the shorter communication packets are of the same size, except from some of the shorter communication packets that carry ends of packets, which may be shorter. Furthermore, according to an embodiment of the invention, the second size threshold equals the size of the shorter communication packets.

Conveniently, every shorter communication packet that is received during the receiving is either a part of a packet the receiving of which was already initialized, or a first shorter communication packet of a previously unreceived packet. According to an embodiment of the invention, the deciding is carried out in response to the first shorter communication packet of the received packet. According to an embodiment of the invention, the generating includes generating a first type descriptor for a packet only if the first shorter communication packet includes an end-of-packet signal of the packet, and a second type descriptor otherwise. It is noted that, conveniently, stage 620 of maintaining a queue that is described below includes enqueuing either a first type descriptor or a second type descriptor pointer which refer to a received packet into the queue only after the end-of-packet signal of the received packet was received.

As an example only, and not intended to limit the scope of the invention in any way, according to an embodiment of the invention, the first size threshold equals a size of the shorter communication packets according to the embodiment of the invention, which is 64 bytes, and the second size threshold equals a size of the memory buffer according to the embodiment of the invention, which is 2 kilobytes. According to another embodiment of the invention, the first size threshold is 128 bytes. According to said embodiment, stage 613 is carried out whenever a first shorter communication packet does not include an end-of-packet signal, since the received packet is larger than 128 bits. The receiving in such situations includes writing the payloads of the shorter communication packets that belongs to said received packet to the same memory buffer to which the second type descriptor refers. If the received packet is smaller than 2 kilobytes, which is the size of a single memory buffer, according to the embodiment of the invention, the writing of the payloads includes writing all the payloads to that same memory buffer. If the received buffer is larger than 2 kilobytes, than the writing of the payloads includes assigning additional memory buffers to the received packets, and updating the second type descriptor so as to refer to all the memory buffers that stores data of said received packet.

According to an embodiment of the invention, stage 610 includes stage 615 of generating a second type descriptor that includes data pertaining to multiple destinations (it is noted that conventionally, the sending of the same data, and especially of the same packet, to multiple destinations, is known as multicasting). It is noted that, according to some embodiments of the invention, some of the packets that are received during the receiving are addressed to multiple destination (such as to multiple clients of a system that carried out method 600). It is noted that according to some embodiments of the invention, method 600 includes duplicating a packet to multiple destination (such as, though not limited to, for the purpose of packet sniffing, or when serving multi users like IPTV (IP television))

Conveniently, stage 615 includes generating a second type descriptor that includes data pertaining to multiple destinations and which includes one or more fields dedicated to store data pertaining to the multiple destinations. According to an embodiment of the invention, stage 615 includes stage 616 of generating a second type descriptor that includes a multicasting bit array, wherein different bits of the multicasting bit array are associated with different destinations.

Conveniently, every bit of the multicasting bit array is associated to a specific queue that is maintained during the maintaining, and denotes whether the packet that is to be multicasted should be sent to the specific queue or not. For example, according to an embodiment of the invention, a logical value "1" of every bit signals that the packet should be multicasted to the queue that is associated with said bit, and a logical value "0" denotes that the packet should not be sent to the queue. It is noted that, according to an embodiment of the invention, additional bits of the second type descriptor are used for multicasting. For example, and not intending to limit the scope of the invention in any way, the multicasting bit array includes 128 bit, that enables each data entity to be sent to any subgroup of a group of 128 queues, wherein additional bits that are stored elsewhere in the second type descriptor denotes one group out of multiple groups of queues. Continuing the same example, the maintaining includes maintaining 512 queues, which are divided into four groups of 128 queues each, wherein each packet could be sent to any subgroup of one of the subgroups of queues, using a single second type descriptor.

According to an embodiment of the invention, stage 610 includes generating at least one second type descriptor that refers to (rather than includes) data which is pertaining to multiple destinations, which is stored elsewhere.

It is noted that a clarifying example is offered in FIGS. 4a and 4b which illustrate a first type descriptor, and a second type descriptor, according to an embodiment of the invention; wherein the first type descriptor includes different fields, such as a location field that refers to a location of a data entity in a memory unit, such as though not necessarily, the memory unit used for the maintaining, a Packet length field that stores data pertaining to the size of the respective packet, and so forth; wherein the second type descriptor includes three different portions, the first of which, is conveniently constructed similarly to first type descriptors, to facilitate the handling of the different types of descriptors during method 600. A second portion includes additional references to memory buffers of the memory unit in which the respective data entity is stored, in case the size of the data entity exceeds the second size threshold, and a third portion includes data pertaining to multiple destinations of the packet. According to an embodiment of the invention, the third portion includes a reference to data pertaining to multiple destinations of the packet that is stored elsewhere.

According to an embodiment of the invention, method 600 includes writing into a queued second type descriptor pointer data that is pertaining to the data entity to which the queued second type descriptor points. Conveniently, the writing of additional packet related data into the second type descriptor pointer is carried out in order to save unnecessary accesses to a memory unit.

Stage 610 is followed by stage 620 of maintaining a queue that stores at least one first type descriptor and at least one second type descriptor pointer. Referring to the examples set forward in the previous drawings, stage 620 is conveniently carried out by memory unit 330.

It is noted that according to some embodiments of the invention, and especially inventions in which at least one memory unit that is used during method 600 is a synchronous dynamic random access memory double data rate (SDRAM DDR) memory unit, the latency times of said memory unit are significant, and can not be ignored from. It is noted that according to some embodiments of the invention, latency times grows as the number of queues maintained in the maintaining grows.

Due to the latency times of memory, many difficulties arise when trying to implement prior art solutions of queues. There are many durations in which data entries that are marked as read in prior art solutions are not already read, and could be overwritten, and similarly, data entries that are marked as written in prior art solutions are in many durations not written yet, and thus could not be requested from the queue.

According to an embodiment of the invention, stage 620 includes stage 621 of updating pointers to data entries stored in the queue (it is noted that referring to the examples set forward in the previous drawings, it is clarifying to review the description of stage 621 in view of FIGS. 5a and 5b):

(a) last written pointer (also denoted in FIGS. 5a and 5b as "push-done"), pointing to a data entry of the maintained queue that was entirely written to the memory unit; wherein last written pointer points to the last data entry that was written to the memory unit;

(b) last assigned pointer (also denoted in FIGS. 5a and 5b as "push-real"), pointing to a data entry that was added last to the queue;

(c) last read pointer (also denoted in FIGS. 5a and 5b as "pop-done"), pointing to a data entry that was entirely read from the memory unit; wherein last read pointer points to the last data entry that was entirely read from the memory unit; and (d) last requested pointer (also denoted in FIGS. 5a and 5b as "pop-real"), pointing to a data entry that was requested last from the queue.

Conveniently, according to embodiments of the invention that implement stage 621, method 600 includes reading data and writing data to queues in the manner described below.

The writing (enqueuing) of a new data entry into the queue includes: (a) assigning to the new data entry an address in the queue, in response to the address of the data entry that is stored in last assigned pointer, and updating (increasing) last assigned pointer immediately after each writing process (it is noted that the updating of the last assigned pointer includes updating the last assigned pointer even prior to any actual writing of data to the memory unit); and (b) transmitting the new data entry to the memory unit, wherein the new data entry is written to the memory unit only after a while (which is a latency time of the memory unit), and, following the successful writing of the new data entry to the queue, updating (increasing) the last written pointer accordingly According to an embodiment of the invention, method 600 includes receiving an acknowledgment from the memory unit regarding the successful writing of the new data entry to the queue.

The reading (de-queuing) of a requested data entry from the queue, includes: (a) requesting the requested data entry which is stored in the queue from the memory unit, in response to the address of the data entry that is stored in last requested pointer, and updating (increasing) the last requested pointer immediately after each requesting (it is noted that the last requested pointer is updated even prior to any actual reading of data from the memory unit); and (b) receiving the requested data entry from the memory unit, wherein the requested data entry is received from the memory unit only after a while (which is a latency time of the memory unit), and updating (increasing) the last read pointer after the requested data entry was successfully read from the queue.

Furthermore, conveniently, prior to writing of the new data entry to the queue, a stage of determining a fullness status of the queue (i.e. if the queue is full or not) is carried out; wherein, according to an embodiment of the invention, it is carried out in response to the last assigned pointer, and in response to the last read pointer. This way of determining prevents overwriting data entries stored in the queue.

In some situations (some of which are described elsewhere in the specifications to the different drawings), it is desirable to carry out a determining of an available data entity status of the queue, which is carried out, according to an embodiment of the invention, in response to the last written pointer, and in response to the last requested pointer.

The calculation of statuses of the queue is thus achieved by simple comparison functions of two pointers, without necessitating a reading of multiple data entries, as is compulsory in prior art solutions. Some additional processes that are simplified to a great extant by implementing the herein described four pointers are: (a) writing multiple data entries to the queue or reading multiple data entries from the queue in a single burst (conveniently facilitated by locating multiple, and especially consecutive, data entries of the queue in a single page of the memory unit); and (b) deleting a full the queue, or parts of the queue, by updating the positions of one or more of the four pointers. It is further noted that the specified pointers structure prevent the competition, familiar in prior art solutions, between the process of writing to the queue and the process of reading from the queue.

According to an embodiment of the invention, the queue is stored in a memory unit that is adapted to store more data entries than the number of data entries that is included in the queue. Conveniently, in such embodiments, stage 621 further includes reading and/or updating at least one of a first data entry pointer (also denoted in FIG. 5b as "start") and a last data entry pointer (also denoted in FIG. 5b as "end"). According to an embodiment of the invention, method 600 includes dynamically adjusting sizes of one or more queues (such as, though not limited to, in response to a dynamically adjustment command from an operator, or in response to a status of one or more queues).

According to an embodiment of the invention, method 600 further includes stage 630 of writing into a queued second type descriptor pointer data that is pertaining to the data entity referred by the second type descriptor to which the queued second type descriptor points. Referring to the examples set forward in the previous drawings, stage 630 is conveniently carried out by processor 320.

According to an embodiment of the invention, method 600 further includes stage 640 of processing a descriptor in order to retrieve a data entity that is associated with the descriptor, wherein stage 640 includes the carrying out of at least one stage out of stages 641 and 642. Referring to the examples set forward in the previous drawings, stage 640 is conveniently carried out by processor 320.

Stage 641 includes processing a first type descriptor in order to retrieve a data entity associated with the first type descriptor.

Stage 642 includes processing a second type descriptor in order to retrieve a data entity associated with the second type descriptor.

It is noted that, according to an embodiment of the invention, method 600 further includes one or more stages of method 700. It is further noted that, according to an embodiment of the invention, method 600 further includes all of the stages of method 700.

FIG. 11 illustrates method 700 for transmitting packets, according to an embodiment of the invention. It is noted that, referring to the examples set forward in the previous drawings, switch 400 is adapted to carry out at least one stage of method 700, and it is thus beneficial to review method 700 in view of the description of FIG. 6 that illustrates switch 400. It is noted that method 700 is not limited to switch 400 and could be carried out by other systems as well.

It should be noted that according to some embodiments of the invention, method 700 is carried out by one or more of systems 200, 300 and 400 which are described above, and which are adapted to carry out method 700 on top of the different embodiments which are described above. According to some embodiments of the invention, the system which carries out method 700 is further adapted to carry out some or all of the stages of method 600.

According to an embodiment of the invention, method 700 starts with stage 701 of receiving a packet for multicasting.

Stage 701 is conveniently followed by stage 702 of generating a multicasting descriptor which refers to a location of a data entity of the received packet in a memory unit, and conveniently stores additional data pertaining to the received packet. It is noted that the multicasting descriptor includes data pertaining to different destinations of the data entity. According to an embodiment of the invention, the generating includes generating a multicasting descriptor that refer to (rather than include) data which is pertaining to multiple destinations, which is stored elsewhere. It is noted that, according to an embodiment of the invention, multicasting descriptors are second type descriptors, as specified previously.

Conveniently stage 702 includes enqueuing the generated multicasting descriptor into a multicasting link-list that is maintained during stage 710 of maintaining. Conveniently, the enqueuing of the generated multicasting descriptor is carried out only after an end-of-packet signal has arrived for the received packet.

Method 700 includes stage 710 of maintaining a multicasting link-list; wherein the multicasting link-list is adapted to store multicasting descriptors. It is noted that, according to an embodiment of the invention, the maintaining is carried out by a double data rate synchronous dynamic random access memory unit. According to an embodiment of the invention, the size of the multicasting descriptors is responsive to a burst size of a memory unit that is used for the maintaining.

Conveniently, every multicasting descriptor includes data which is pertaining to multiple destinations of a data entity (it is noted that conventionally, the sending of the same data, and especially of the same packet, to multiple destinations, is known as multicasting). Conveniently, multicasting descriptors include one or more fields which are dedicated to store data pertaining to the multiple destinations. According to an embodiment of the invention, multicasting descriptors include a multicasting bit array, wherein different bits of the multicasting bit array are associated with different destinations.

Conveniently, the maintaining includes maintaining multiple queues, which are associated to the different destinations. According to an embodiment of the invention, every bit of the multicasting bit array is associated to a specific queue, and denotes whether the packet that is to be multicasted should be sent to the specific queue or not. For example, according to an embodiment of the invention, a logical value "1" of every bit signals that the packet should be multicasted to the queue that is associated with said bit, and a logical value "0" denotes that said packet should not be sent to the queue.

It is noted that, according to an embodiment of the invention, additional bits of the multicasting descriptor are used for multicasting. For example, and not intending to limit the scope of the invention in any way, the multicasting bit array includes 128 bit, that enables each data entity to be sent to any subgroup of a group of 128 queues maintained during the maintaining, wherein additional bits that are stored elsewhere in multicasting descriptor denotes one group out of multiple groups of queues. Continuing the same example, the maintaining includes maintaining 512 queues, which are divided into four groups of 128 queues each, wherein each packet could be sent to any subgroup of one of the subgroups of queues, using a single multicasting descriptor.

According to an embodiment of the invention, the maintaining includes maintaining a link-list of multicasting descriptors, wherein multicasting descriptors that are stored in that multicasting link-list (which is a multicasting link-list) stores a next multicasting descriptor pointer to a next multicasting descriptor in the multicasting link-list. Conveniently, the maintaining includes reading and/or updating a first multicasting descriptor pointer and a last multicasting descriptor pointer. It is noted that according to an embodiment of the invention in which a first portion of the multicasting descriptors is similar to the first type descriptors which are described above, the next multicasting descriptor pointer is stored in the first portion. This is conveniently carried out to save accesses to the memory unit used for the maintaining. Conveniently, stage 702 includes generating and storing of the next multicasting descriptor pointer.

It is noted that on some situations, many of the packets that are received during the receiving are small packets (such as packets that are smaller than a first size threshold such as the first size threshold described above). According to an embodiment of the invention, in order to counter problems that rises when maintaining a multicasting link-list that refers to small packets, stage 702 includes generating and storing into the multicasting descriptor a further multicasting descriptor pointer, that points to a multicasting descriptor that is a predetermined number of multicasting descriptors ahead in the multicasting link-list. For example, in the embodiment of the invention that is illustrated in FIG. 6, every multicasting descriptor that is stored in the multicasting link-list stores a further multicasting descriptor pointer to a multicasting descriptor that is three multicasting descriptors ahead (as illustrated by the curved arrows). Such an embodiment of the invention also facilitate reducing the number of accesses to the memory unit, as multiple multicasting descriptors could be read in one access. It will be clear to any person that is skilled in the art that such an embodiment of the invention may necessitate the reading and/or the updating of multiple first multicasting descriptor pointers. It is clear to any person skilled in the art that next multicasting descriptor pointer is essentially a further multicasting descriptor pointer that points do a multicasting descriptor that is one place further.

According to an embodiment of the invention, stage 702 includes generating and storing the further multicasting descriptor pointer, in order to save an additional future access to the memory unit. However, as stage 702 conveniently includes enqueuing the multicasting descriptor into the multicasting link-list only after an end-of-packet signal had arrive for the received packet, some times, according to such an embodiment of the invention, there is a need to update the further multicasting descriptor pointer, in situations in which packets that are to be multicasted are enqueued to multicasting link-list in an order that is different than the order in which they were initially received. This situation requires an additional access to the memory unit, but it is clear to any person skilled in the art that if the packets received during the receiving are short, this situation does not occur, as the order of the packets is kept, and if the packets received during the receiving are relatively long, the additional access is negligible in relation to the handling of the long packet.

Conveniently method 700 includes stage 720 of generating multiple first type descriptors or multiple multicasting descriptor pointers in response to the first multicasting descriptor; wherein the data entries refer to the data entity. Stage 720 is conveniently followed by stage 730 of providing first type descriptors or multicasting descriptor pointers to queues from which the sending of stage 740 is carried out.

Conveniently, the providing of stage 730 includes one of the following actions:

(a) providing first type descriptors to queues that are referred to by the first multicasting descriptor; or (b) providing multicasting descriptor pointers which point to the first multicasting descriptor, to queues that are referred to by the first multicasting descriptor.

Conveniently, the providing of first type descriptors to queues that are referred to by the first multicasting descriptor, will be followed by the carrying out of stage 741 of sending the data entity in response to multiple first type descriptors that are stored in queues that are associated with the multiple destinations; whereas the providing of multicasting descriptor pointers which point to the first multicasting descriptor to queues that are referred to by the first multicasting descriptor, will be followed by the carrying out of stage 742 of sending the data entity in response to multiple multicasting descriptor pointers that are stored in queues that are associated with the multiple destinations It is noted that, according to an embodiment of the invention, the providing of the data entries is carried out in response to the size of the packet, wherein stage 730 includes providing first type descriptors in order to multicast data entities that are smaller than a second size threshold, and enqueuing of multicasting descriptor pointers in order to multicast data entities that are larger than the second size threshold. It is noted that according to an embodiment of the invention, multicasting descriptor pointers are second type descriptor pointers.

It is clear to any person skilled in the art that is desirable that method 700 will include de-queuing the first multicasting descriptor and discarding the data entity to which the first multicasting descriptor refers, after stage 740 of sending is carried out. Conveniently, method 700 includes first deciding when to de-queue the first multicasting descriptor and to discard said data entity in response to: (a) a requested number of duplications; and (b) a duplications counter.

It is noted that during the multicasting of large data entities, according to an embodiment of the invention, method 700 includes the storing a reference to the data entity only in the first multicasting descriptor, and therefore stage 760 of de-queuing could not be carried out prior to the sending of said data entity to all the destinations. During the multicasting of relatively short packages, method 700 includes storing references to the data entities also in the first type descriptors which are duplicated to the different queues.

Conveniently, stage 730 is followed, and on occasions is partially concurrent to, stage 740 of sending a data entity that is referred to by a first multicasting descriptor (which is conveniently the first multicasting descriptor in the multicasting link-list), to the multiple destinations that are indicated in the first multicasting descriptor. Since the sending is conveniently carried out from multiple queues that are associated to the different locations, Conveniently, method 700 includes stage 750 of updating one or more counters, which specifically includes updating the duplication counter whenever a duplicated first type descriptor is de-queued from a queue of switch 400, following the successful sending of the data entity was to a destination. It is noted that stage 750 is conveniently carried out at least partially concurrently to stage 740.

However, the first deciding as described above is only applicable if all the duplications of the data entity are successful. According to an embodiment of the invention, method 700 includes second deciding, for at least a portion of the queues, whether to admit or to deny each first type descriptor or each multicasting descriptor pointer to the queue to which it is assigned. It is noted that, conveniently, denial of first type descriptors or of multicasting descriptor pointers from being enqueued into a queue is decided upon when the transmission rate of the queue (or of the output port to which that queue is associated) exceeds a predetermined transmission rate threshold that is assigned to that queue (or to said output port).

It is clear to any person skilled in the art that, if one or more of the multicasting descriptor pointers or if one or more of the duplicated first type descriptors are denied from the queues to which they are assigned, than the sending will include sending less duplications of the packet than the requested number of duplications. Therefore, in such embodiments, the first deciding must be carried out in response to: (a) the requested number of duplications; (b) the duplications counter; and (c) a rejected duplications counter, wherein the rejected duplications counter is indicative of the number of multicasting descriptor pointers that were denied, and, according to an embodiment of the invention, to a number of duplications that failed as a result from other reasons. It is noted that, according to an embodiment of the invention, method 700 further includes storing inside a multicasting descriptor a value of at least one of: (a) a requested number of duplications; (b) a duplications counter; and (c) a rejected duplications counter. This storing is conveniently carried out in response to instances of the second deciding.

In order to successfully de-queue the first multicasting descriptor from the multicasting link-list, the first deciding is dependent on a successful obtaining of the value of the rejected duplications counter.

According to an embodiment of the invention, stage 730 includes storing values of the failed duplication counter in the duplicated first type descriptors, on occasions in which first type descriptors are generated, rather than multicasting descriptor pointers. According to an embodiment of the invention, method 700 includes storing values of the failed duplication counter in the multicasting descriptor pointers. According to an embodiment of the invention, stage 730 further includes stage 731 of buffering either a duplicated first type descriptor or a multicasting descriptor pointer, wherein each duplicated first type descriptor and/or each multicasting descriptor pointer that were generated and were approved to be admitted to a queue are going through the buffering.

Stage 731 is followed by stage 732 of providing the buffered first type descriptor or multicasting descriptor pointer after another multicasting descriptor pointer was generated and approved to be admitted to a queue; wherein the providing of stage 731 is concurrent with the buffering of the another data entry. Conveniently, stage 732 is followed by an instance of stage 750 by updating the value of the rejected duplications counter, which is conveniently stored in another data entry. Once there are no more duplications to carry out, stage 733 is carried out; wherein stage 733 includes reading the value of the rejected duplications counter from the buffered data entry and providing the data entry to the relevant queue. stage 733 is conveniently carried out, in response to: the requested number of duplications; the duplications counter; and the rejected duplications counter The first deciding thus conveniently includes determining the actual number of duplications needed, in response to the requested number of duplications and to the rejected duplications number.

Stage 750 is followed by stage 760 of de-queuing a multicasting descriptor from the multicasting link-list in response to: (a) a requested number of duplications; (b) a duplications counter; and (c) a rejected duplications counter; wherein stage 760 conveniently includes de-queuing the first multicasting descriptor and to discarding the data entity that is referred by the first multicasting descriptor once the numbers of duplications equals the actual number of duplications needed.

According to an embodiment of the invention, method 700 further includes generating multiple multicasting descriptor pointers which point to a multicasting descriptor which was dequeued from the multicasting link-list, and discarding the multicasting descriptor in response to (a) the requested number of duplications; (b) the duplications counter; and (c) the rejected duplications counter.

According to an embodiment of the invention, stage 760 includes stage 761 of dequeuing a multicasting descriptor that includes a multicasting bit array (which is described above), wherein different bits of the multicasting bit array are associated with different destinations.

According to an embodiment of the invention, method 700 further includes transmitting unicast packets to a single destination, wherein conveniently, method 700 further includes providing one or more unicast packets to a queue without generating a multicasting descriptor for the unicast packet. According to an embodiment of the invention, method 700 includes transmitting at least one packet to a small numbers of destinations without generating a multicasting descriptor for that packet, by creating either a first type descriptor or a second type descriptor pointer that refers to a second type descriptor, and providing said descriptor to a small number of queues which are associated with the small number of destinations.

According to an embodiment of the invention, method 700 further includes prioritizing unicast transmissions over multicast transmissions aimed to a large number of destinations. According to an embodiment of the invention which implement that prioritization, method 700 further includes prioritizing multicast transmissions aimed to a small number of destinations over unicast transmissions.

According to an embodiment of the invention, method 700 includes providing duplicated first type descriptors or duplicated multicasting descriptor pointers to queues in response to the first multicasting descriptor only when there is no unicast traffic. Conveniently, according to this embodiment, method 700 further includes postponing the carrying out of stage 730 if a unicast packet arrives, and to resume the carrying out of stage 730 only when there is once again no unicast traffic.

It is noted that, according to an embodiment of the invention, method 700 further includes one or more stages of method 600. It is further noted that, according to an embodiment of the invention, method 700 further includes all of the stages of method 600.

According to an embodiment of the invention, the invention includes a computer readable medium having computer-readable code embodied therein for queuing descriptors, the computer-readable code including instructions for: (a) generating a first type descriptor, a second type descriptor and a second type descriptor pointer; and (b) maintaining a queue that stores at least one first type descriptor and at least one second type descriptor pointer; wherein the first type descriptors and the second type descriptors describe received data entities, and wherein a size of a second type descriptor pointer equals a size of a first type descriptor.

According to an embodiment of the invention, the computer readable code includes instructions for processing a first type descriptor in order to retrieve a data entity associated with the first type descriptor; and instructions for processing a second type descriptor in order to retrieve a data entity associated with the second type descriptor.

According to an embodiment of the invention, the computer readable code includes instructions for generating a second type descriptor for a data entity that exceeds a first size threshold; and instructions for allocating a single memory buffer to store a data entity portion that is smaller than a second size threshold; wherein the first size threshold is smaller than the second size threshold.

It is noted that, according to an embodiment of the invention, the first size threshold is responsive to short data entities whereas the second size threshold is responsive to long data entities.

According to an embodiment of the invention, the computer readable code includes instructions for generating a second type descriptor that comprises data pertaining to multiple destinations.

According to an embodiment of the invention, the computer readable code includes instructions for generating a second type descriptor that comprises a multicasting bit array, wherein different bits of the multicasting bit array are associated with different destinations.

According to an embodiment of the invention, the computer readable code includes instructions for writing into a queued second type descriptor pointer data that is pertaining to the data entity referred by the second type descriptor to which the queued second type descriptor points.

According to an embodiment of the invention, the computer readable code includes instructions for updating pointers to data entries stored in the queue: (a) a last written pointer, pointing to a data entry that was entirely written to the memory unit; (b) a last assigned pointer, pointing to a data entry that was added last to the queue; (c) a last read pointer, pointing to a data entry that was entirely read from the memory unit; and (d) a last requested pointer, pointing to a data entry that was requested last from the queue.

According to an embodiment of the invention, the computer readable code includes instructions for maintaining the queue in a double-data-rate synchronous dynamic random access memory unit.

It is noted that, according to an embodiment of the invention, the size of the first type descriptor is responsive to a burst size of the memory unit. It is further noted that since conveniently the size of the second type descriptor pointers equals the size of the first type descriptors, it is thus also responsive to the burst size of the memory unit.

According to an embodiment of the invention, the computer readable code includes instructions for generating a second type descriptor that comprise a first portion; wherein a size of the first portion equals the size of the first type descriptors, and at least one field of the first portion is identical to at least one field of the first type descriptors.

According to an embodiment of the invention, the computer readable code includes instructions for receiving a packet via an input port of a switch.

According to an embodiment of the invention, the invention includes a computer readable medium having computer-readable code embodied therein for transmitting packets, the computer-readable code includes instructions for: maintaining a multicasting link-list; and instructions for de-queuing a multicasting descriptor from the multicasting link-list in response to: (a) a requested number of duplications; (b) a duplications counter; and (c) a rejected duplications counter.

According to an embodiment of the invention, the computer-readable code further includes instructions for storing inside a multicasting descriptor a value of at least one of: (a) a requested number of duplications; (b) a duplications counter; and (c) a rejected duplications counter.

According to an embodiment of the invention, the computer-readable code includes: (a) instructions for generating multiple multicasting descriptor pointers in response to a multicasting descriptor; (b) instructions for providing a multicasting descriptor pointer after another multicasting descriptor pointer was generated; and (c) instructions for providing the last multicasting descriptor pointer, in response to: the requested number of duplications; the duplications counter; and the rejected duplications counter; wherein the providing of the last multicasting descriptor pointer is carried out prior to the de-queuing.

According to an embodiment of the invention, the computer-readable code includes instructions for de-queuing a multicasting descriptor that comprises a multicasting bit array, wherein different bits of the multicasting bit array are associated with different destinations.

According to an embodiment of the invention, the computer-readable code includes instructions for maintaining the multicasting link-list in a double-data-rate synchronous dynamic random access memory unit.

It is noted that, according to an embodiment of the invention, the size of the multicasting descriptor is responsive to a burst size of the memory unit.

According to an embodiment of the invention, the computer-readable code includes: (a) instructions for generating a first type descriptor, a second type descriptor and a second type descriptor pointer; and (b) instructions for maintaining a queue that stores at least one first type descriptor and at least one second type descriptor pointer; wherein the first type descriptors and the second type descriptors describe received data entities, and wherein a size of a second type descriptor pointer equals a size of a first type descriptor.

According to an embodiment of the invention, the invention includes a computer readable medium having computer-readable code embodied therein for transmitting packets, the computer-readable code comprising instructions for: (a) prioritizing a unicast transmission over a multicast transmission that is aimed to a large number of destinations; and, according to an embodiment of the invention, for (b) prioritizing a multicast transmission aimed to a small number of destinations over unicast transmission.

According to an embodiment of the invention, the computer-readable code includes instructions for maintaining a multicasting link-list; and instructions for de-queuing a multicasting descriptor from the multicasting link-list in response to: (a) a requested number of duplications; (b) a duplications counter; and (c) a rejected duplications counter.

According to an embodiment of the invention, the computer-readable code includes instructions for accessing a double-data-rate synchronous dynamic random access memory unit.

According to an embodiment of the invention, the computer-readable code includes: (a) instructions for generating a first type descriptor, a second type descriptor and a second type descriptor pointer; and (b) instructions for maintaining a queue that stores at least one first type descriptor and at least one second type descriptor pointer; wherein the first type descriptors and the second type descriptors describe received data entities, and wherein a size of a second type descriptor pointer equals a size of a first type descriptor.

According to an embodiment of the invention, the computer readable code includes instructions for generating multiple multicasting descriptor pointers which point to a multicasting descriptor which was dequeued from the multicasting link-list, and instructions for discarding the multicasting descriptor in response to (a) the requested number of duplications; (b) the duplications counter; and (c) the rejected duplications counter.

The present invention can be practiced by employing conventional tools, methodology and components. Accordingly, the details of such tools, component and methodology are not set forth herein in detail. In the previous descriptions, numerous specific details are set forth, in order to provide a thorough understanding of the present invention. However, it should be recognized that the present invention might be practiced without resorting to the details specifically set forth.

Only exemplary embodiments of the present invention and but a few examples of its versatility are shown and described in the present disclosure. It is to be understood that the present invention is capable of use in various other combinations and environments and is capable of changes or modifications within the scope of the inventive concept as expressed herein.

We claim:

1. A system comprising:
a processor, adapted to generate first type descriptors, second type descriptors and second type descriptor pointers; wherein the first type descriptors and the second type descriptors describe data entities received by the system, wherein different descriptors of the first type descriptors and the second type descriptors describe different data entities received by the system; wherein a size of a second type descriptor pointer equals a size of a first type descriptor; wherein a second type descriptor pointer points to a second type descriptor; and wherein a size of the first type descriptor is smaller than a size of a second type descriptor; and
a memory unit, coupled to the processor, adapted to maintain a queue that stores at least one first type descriptor and at least one second type descriptor pointer; wherein the processor is further adapted to generate a second type descriptor that comprises data pertaining to multiple destinations.

2. The system according to claim 1, wherein the processor is adapted to: process first type descriptors in order to retrieve data entities associated with the first type descriptors and to process second type descriptors in order to retrieve data entities associated with the second type descriptors.

3. The system according to claim 1, wherein the processor is further adapted to generate a second type descriptor for a data entity that exceeds a first size threshold and to allocate a single memory buffer to store a data entity portion that is smaller than a second size threshold; wherein the first size threshold is smaller than the second size threshold.

4. The system according to claim 3, wherein the first size threshold is responsive to a length of short data entities whereas the second size threshold is responsive to a length of long data entities.

5. The system according to claim 1, wherein the processor is further adapted to generate a second type descriptor that comprises a multicasting bit array, wherein different bits of the multicasting bit array are associated with different destinations.

6. The system according to claim 1, wherein the processor is further adapted to write into a queued second type descriptor pointer data that is pertaining to the data entity referred by the second type descriptor to which the queued second type descriptor points.

7. The system according to claim 1, wherein the processor is adapted to update pointers to data entries stored in the queue: (a) a last written pointer, pointing to a data entry that was entirely written to the memory unit; (b) a last assigned pointer, pointing to a data entry that was added last to the queue; (c) a last read pointer, pointing to a data entry that was entirely read from the memory unit; and (d) a last requested pointer, pointing to a data entry that was requested last from the queue.

8. The system according to claim 1, wherein the memory unit is a double-data-rate synchronous dynamic random access memory unit.

9. The system according to claim 1, wherein a size of the first type descriptor is responsive to a burst size of the memory unit.

10. The system according to claim 1, wherein the processor is adapted to generate second type descriptors that comprise a first portion; wherein a size of the first portion equals the size of the first type descriptors, and at least one field of the first portion is identical to at least one field of the first type descriptors.

11. The system according to claim 1, wherein the system is a switch that is adapted to receive a packet via an input port, and to transmit a packet via an output port.

12. The system according to claim 1, wherein the processor is adapted to de-queue a multicast descriptor from a multicasting queue in response to: (a) a requested number of duplications; (b) a duplications counter; and (c) a failed duplications counter; and the memory unit, is adapted to maintain the multicasting queue.

13. The system according to claim 1, wherein the processor is adapted to (a) prioritize unicast transmissions over multicast transmissions aimed to a large number of destinations;

and (b) prioritize multicast transmissions aimed to a small number of destinations over unicast transmissions; and wherein the memory unit, coupled to the processor, adapted to store a data entity that is transmitted in a unicast transmission, a data entity that is transmitted in a multicast transmission aimed to a large number of destinations, and a data entity that is transmitted in a multicast transmission aimed to a small number of destinations.

14. A method for queuing descriptors, the method comprises:

generating a first type descriptor, a second type descriptor and a second type descriptor pointer; and maintaining a queue that stores at least one first type descriptor and at least one second type descriptor pointer;

wherein the first type descriptors and the second type descriptors describe received data entities, and wherein a size of a second type descriptor pointer equals a size of a first type descriptor wherein a second type descriptor pointer points to a second type descriptor;

wherein different descriptors of the first type descriptors and the second type descriptors describe different data entities received by the system; and wherein a size of a first type descriptor is smaller than the size of the second type descriptor;

wherein generating comprises generating a second type descriptor that comprises data pertaining to multiple destinations.

15. The method according to claim 14, further comprising processing a first type descriptor in order to retrieve a data entity associated with the first type descriptor; and processing a second type descriptor in order to retrieve a data entity associated with the second type descriptor.

16. The method according to claim 14, wherein the generating comprises generating a second type descriptor for a data entity that exceeds a first size threshold, and allocating a single memory buffer to store a data entity portion that is smaller than a second size threshold; wherein the first size threshold is smaller than the second size threshold.

17. The method according to claim 16, wherein the first size threshold is responsive to a length of short data entities whereas the second size threshold is responsive to a length of long data entities.

18. The method according to claim 14, wherein the generating comprises generating a second type descriptor that comprises a multicasting bit array, wherein different bits of the multicasting bit array are associated with different destinations.

19. The method according to claim 14, further comprising writing into a queued second type descriptor pointer data that is pertaining to the data entity referred by the second type descriptor to which the queued second type descriptor points.

20. The method according to claim 14, further comprising updating pointers to data entries stored in the queue: (a) a last written pointer, pointing to a data entry that was entirely written to the memory unit; (b) a last assigned pointer, pointing to a data entry that was added last to the queue; (c) a last read pointer, pointing to a data entry that was entirely read from the memory unit; and (d) a last requested pointer, pointing to a data entry that was requested last from the queue.

21. The method according to claim 14, wherein the maintaining comprises maintaining the queue in a double-data-rate synchronous dynamic random access memory unit.

22. The method according to claim 14, wherein the generating comprises generating a second type descriptor that comprises a first portion; wherein a size of the first portion equals the size of the first type descriptors, and at least one field of the first portion is identical to at least one field of the first type descriptors.

23. A non-transitory computer readable medium having computer-readable code embodied therein for queuing descriptors, the computer-readable code comprising instructions for:

generating a first type descriptor, a second type descriptor and a second type descriptor pointer; and maintaining a queue that stores at least one first type descriptor and at least one second type descriptor pointer;

wherein the first type descriptors and the second type descriptors describe received data entities, and wherein a size of a second type descriptor pointer equals a size of a first type descriptor;

wherein different descriptors of the first type descriptors and the second type descriptors describe different data entities received by the system;

wherein a second type descriptor pointer points to a second type descriptor and wherein a size of a first type descriptor is smaller than the size of the second type descriptor;

wherein generating comprises generating a second type descriptor that comprises data pertaining to multiple destinations.

* * * * *